July 16, 1957

H. P. LUHN 2,799,451

BINARY CODE COUNTER

Filed Feb. 23, 1954

INVENTOR.
HANS P. LUHN
BY
Kenyon & Kenyon
ATTORNEYS

July 16, 1957    H. P. LUHN    2,799,451
BINARY CODE COUNTER
Filed Feb. 23, 1954    10 Sheets-Sheet 3

INVENTOR.
HANS P. LUHN
BY
*Kenyon & Kenyon*
ATTORNEYS

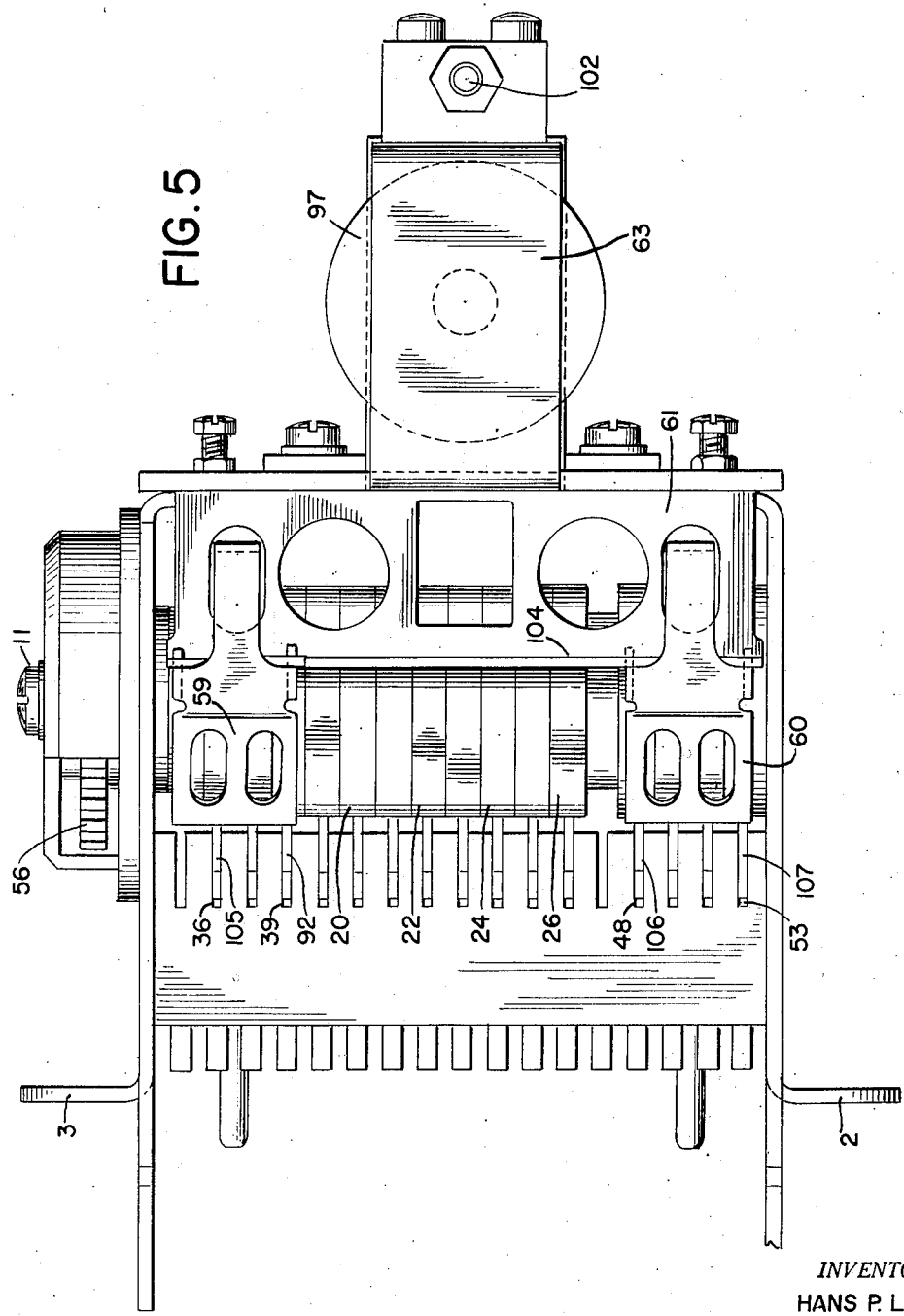

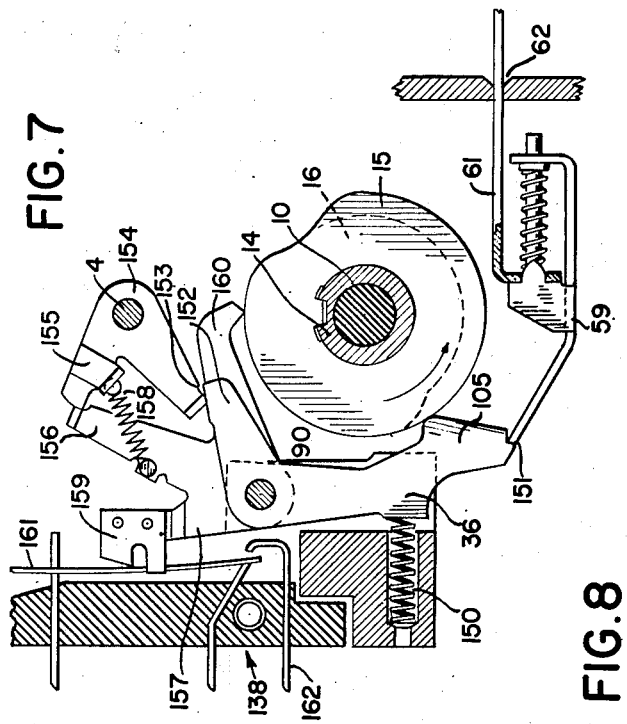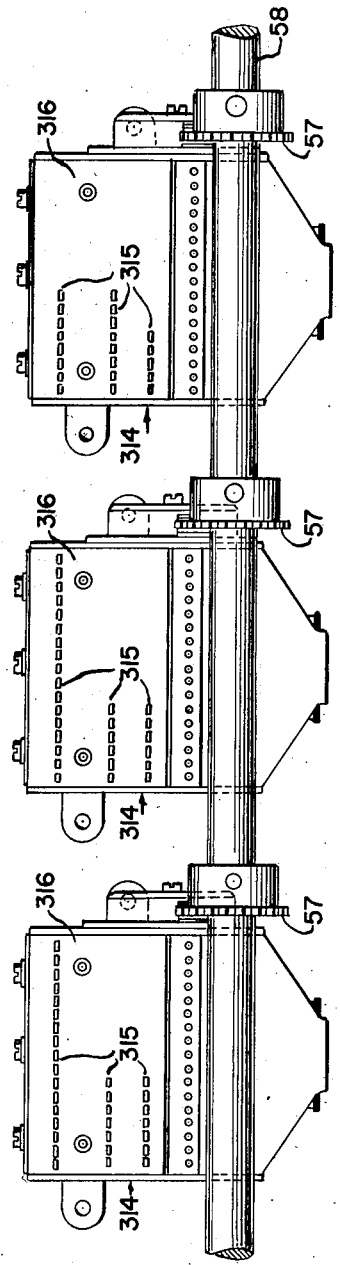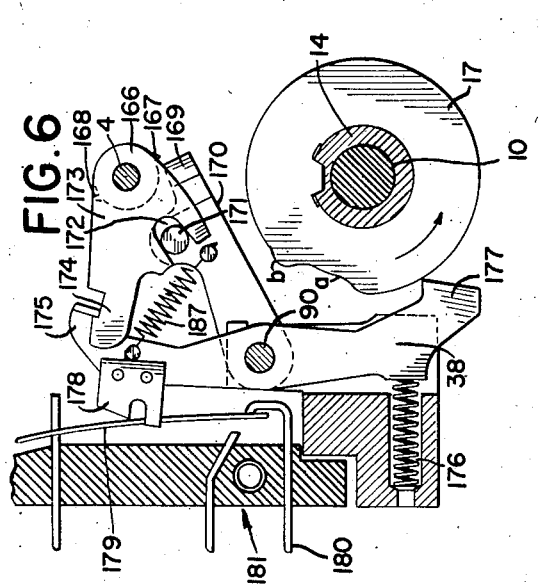

July 16, 1957 H. P. LUHN 2,799,451
BINARY CODE COUNTER
Filed Feb. 23, 1954 10 Sheets-Sheet 6
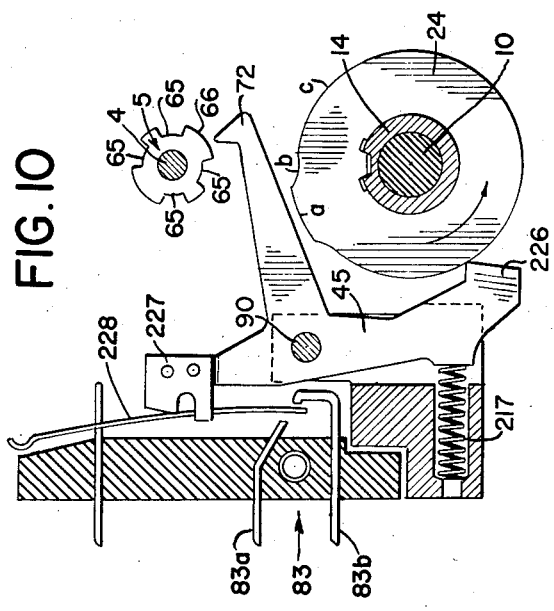
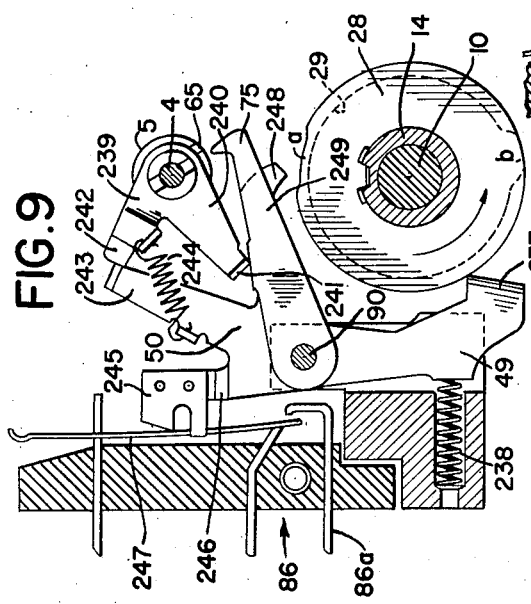
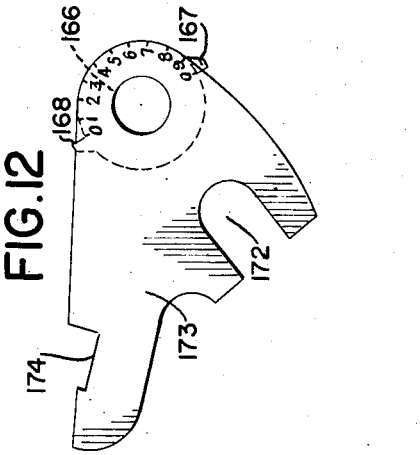
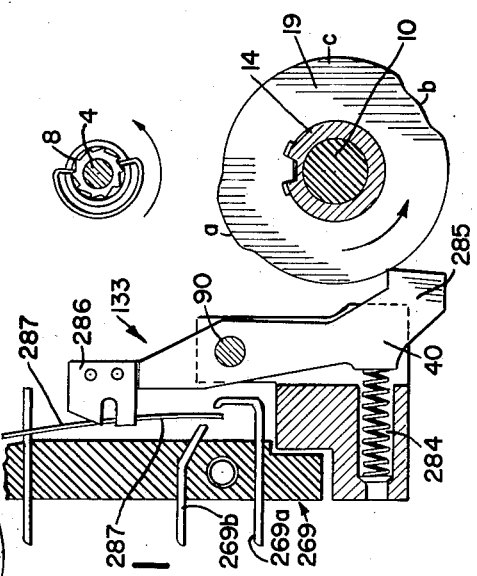
INVENTOR.
HANS P. LUHN
BY
Kenyon & Kenyon
ATTORNEYS July 16, 1957 H. P. LUHN 2,799,451
BINARY CODE COUNTER
Filed Feb. 23, 1954 10 Sheets-Sheet 8

*INVENTOR.*
HANS P. LUHN
BY
ATTORNEYS

United States Patent Office 2,799,451
Patented July 16, 1957

2,799,451
BINARY CODE COUNTER

Hans P. Luhn, Armonk, N. Y., assignor to International Business Machines Corporation, New York, N. Y., a corporation of New York Application February 23, 1954, Serial No. 411,876

31 Claims. (Cl. 235—61)

This invention relates to a counter mechanism which automatically performs by electro-mechanical means desired arithmetical computations with coded numerical quantities delivered to the counter in the form of time-staggered electrical pulses from a device of the type which generates such pulses from the sensing of perforated record cards, a punched tape, a magnetic tape or drum, or the like.

The principal object of this invention is to provide an electrically controlled, mechanically driven binary code counter which will accumulate information in response to binary code electrical pulse groups delivered to it at a much higher pulse group rate than that capable of attainment with previous code counters. This increased rate is attained by using a counter mechanism which permits feeding one pulse group into the counter at the same time that the result obtained with the immediately preceding pulse group is being ascertained and fed out of the counter. This object is further aided by fully utilizing all of the time which is provided for during each cycle of operation for causing the cumulative advancement of the counter mechanism in response to the electrical pulses received at the counter input.

Another object of this invention is to provide a code counter in which the carry arising during the advance of the counting means is stored when it occurs and is transferred at a later predetermined time in the counter cycle of operation.

A further object of this invention is to provide electrical input and output circuits for a code counter in which maximum utilization of a minimum number of circuit elements is achieved.

Another object of this invention is to automatically detect the presence of negative numbers standing in the counter so that they will be appropriately designated as such when they are fed out of the counter.

Another object of this invention is to provide for automatic resetting of the counter to a zero position by causing the nines complement of the number standing in the counter to be fed from the output back into the input when resetting is desired.

Still another object is to provide for an automatic confirmation available at the end of each cycle for showing whether the counter has been reset to a zero indication.

Other objects of the invention will be pointed out in the following description and claims and illustrated in the accompanying drawings which disclose by way of example the principle of the invention and the best mode which has been contemplated of applying that principle.

In the drawings:

Fig. 5 is a bottom plan view of the counter mechanism showing the armature and interposers;

Fig. 6 is a sectional view taken on lines 6—6 of Fig. 1 showing the carry switch tripping and resetting mechanism;

Fig. 7 is a sectional view taken on lines 7—7 of Fig. 1 showing the 8-tripping and reset mechanism;

Fig. 8 is a rear elevation view of a group of three counters embodying the invention showing them arranged for synchronous mechanical operation;

Fig. 9 is a sectional view taken on lines 9—9 of Fig. 1 showing the zero readout sensing and storage mechanism;

Fig. 10 is a sectional view taken on lines 10—10 of Fig. 1 showing the binary -2- readout sensing mechanism;

Fig. 11 is a sectional view taken on lines 11—11 showing the program switch mechanism;

Fig. 12 is an enlarged view of the latch member and cam of the carry switch mechanism shown in Fig. 6;

In a conventional counter group the information being accumulated is fed into the "units" counter only, and the "units" counter must make one complete revolution to move the "tens" counter to the next higher digit, and so on.

The counter group to be described can be visualized as having counters analogous to the "units," "tens" and "hundreds" counters of the conventional counter group, but in the present mechanism the separate digit components of the information to be accumulated are fed to the respective counters simultaneously, or in parallel, rather than feeding only units components to the "units" counter as in the conventional counter group just mentioned. This parallel feed is possible because the information to be fed into each counter of the group is obtained in its separate particular digit quantity from a perforated card, punched tape or other source and fed directly to the particular digit counter. The "carry" for each digit counter is stored temporarily and then added in after the other operations have been performed for that particular numerical cycle. A "cycle" comprises one revolution of a plurality of programming cams keyed to a continuously rotating shaft described below, and signifies the insertion of one row of digits into the respective counters of the counter group.

Although, as indicated above, the present invention is adaptable for use in conjunction with any suitable source of information to be accumulated such as cards, tapes and the like, its operation will be explained for use with perforated cards, in which decimal figures are represented by punching the card using a modified binary code. For the purpose of the present description a counter group comprised of three digit counters will be discussed, but it is apparent that a counter group for any number of digits will have the same basic method of operation as that herein disclosed.

Figure 1:
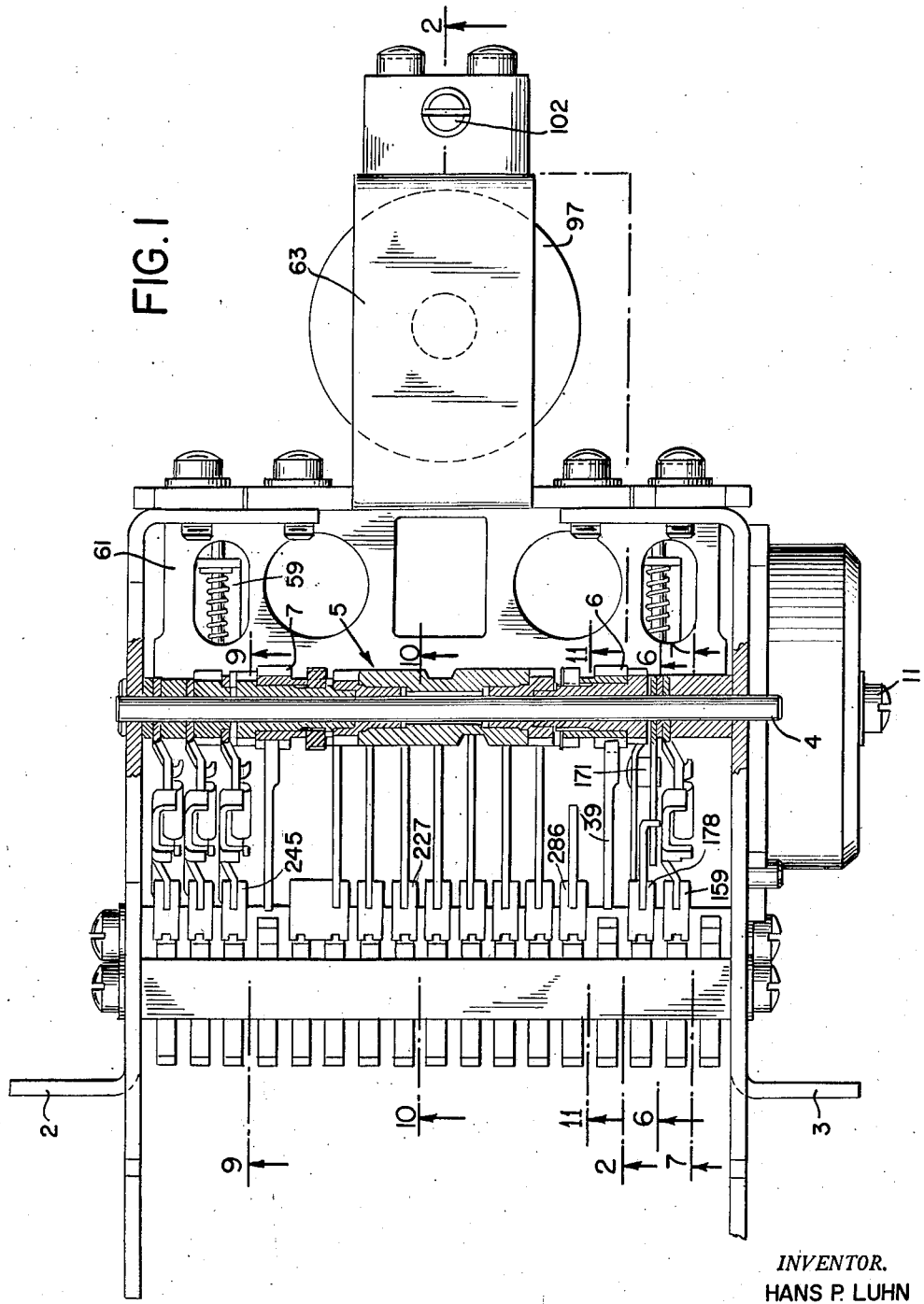
Fig. 1 is an enlarged partially sectionalized plan view of a counter mechanism embodying the invention.
Figure 2:
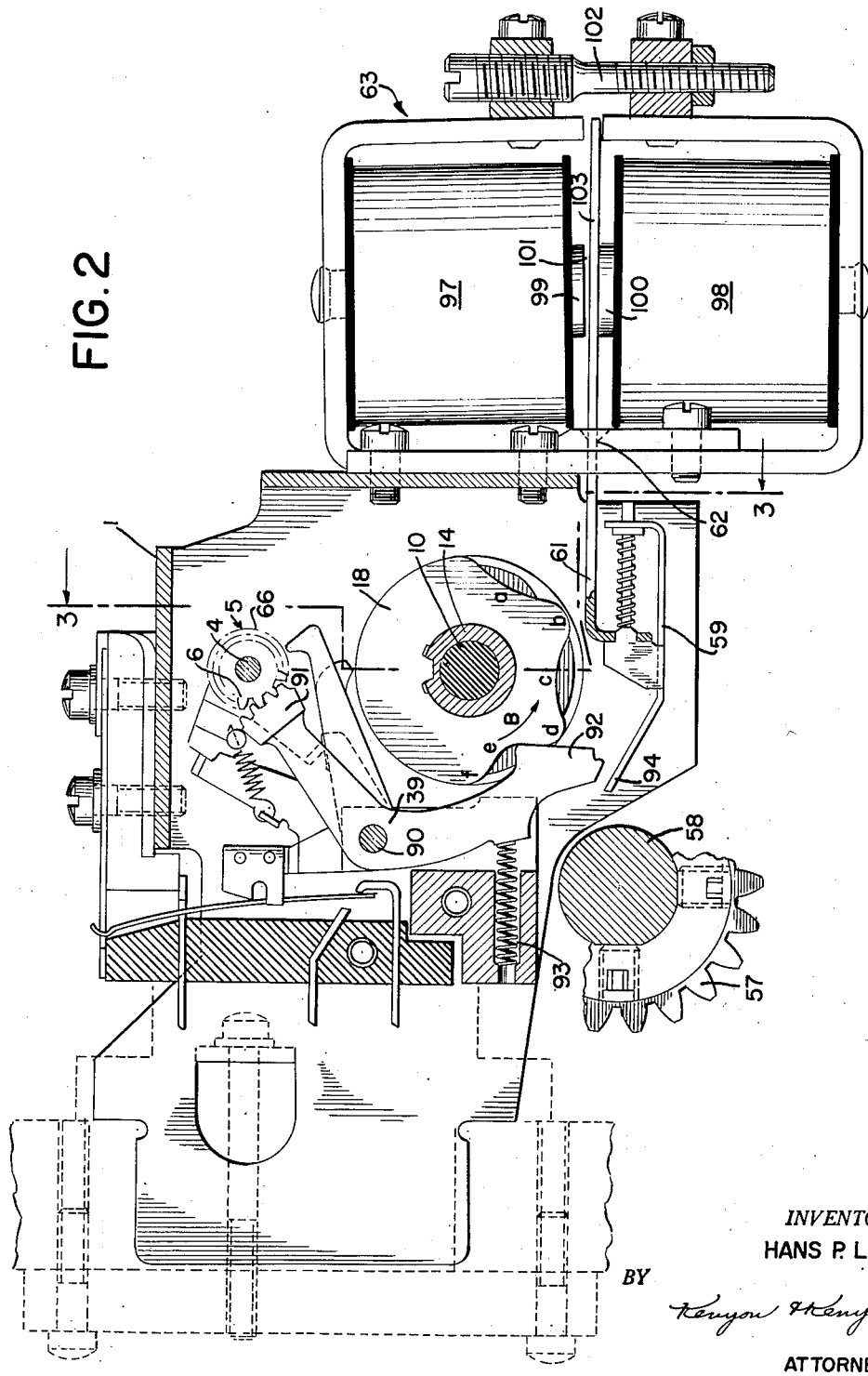
Fig. 2 is a sectional elevation taken on lines 2—2 of Fig. 1 showing the Readout Drum advancing mechanism.
Figure 3:
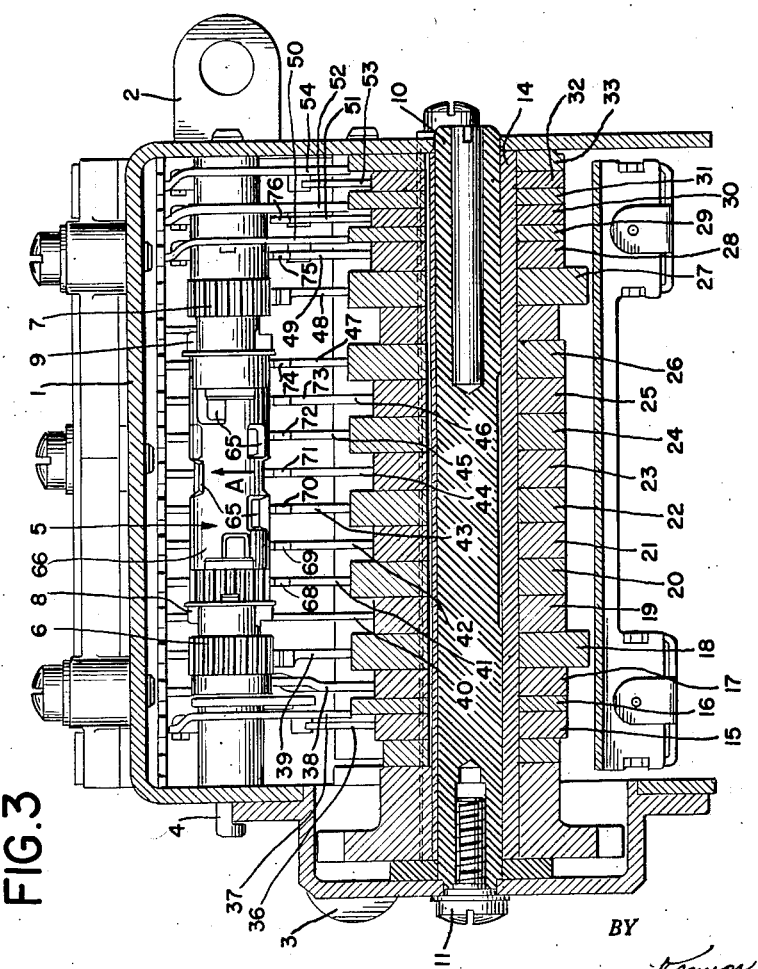
Fig. 3 is a sectional front elevation taken on lines 3—3 of Fig. 2 showing the positional relationship of the Readout Drum, programming cams, and sensing fingers.

Referring to Figs. 1, 2 and 3, the general arrangement is shown of the principal parts of a single counter embodying the features of the present invention. Fig. 3 shows the outer housing 1 with mounting brackets 2 and 3 for securing the housing to a suitable support. Journaled within said housing 1 is a shaft 4 on which is rotatably mounted a counting or readout drum 5. This readout drum 5 is a small cylinder whose circumference represents 2×10 decimal units so that in one complete revolution the cylinder would count from one to ten twice. This duplication is merely for convenience in size of the drum. Rotatably mounted on shaft 4 adjacent opposite end portions of said drum 5 are drum advancing gears 6 and 7 which are coupled to the drum through respective conventional types of ratchet couplings 8 and 9 to insure that only when said gears are rotated in the direction of advance shown by arrow A will the drum 5 be rotated. Thus, drum 5 can only be advanced, not rotated backwards.

A second shaft 10 is mounted in the housing 1 parallel to shaft 4 and is rigidly secured at one of its ends to the housing 1 as by screw 11. Hollow shaft 14 is coaxially mounted on shaft 10 and is rotatable with respect thereto. Keyed to rotatable shaft 14 are nineteen programming cams 15–33 inclusive which impart synchronous motion to the related levers 36–54 inclusive which levers control the mechanical operations of the counter as will be hereinafter described in detail. Also keyed near one end of rotatable shaft 14 is a gear 56 which is the driving gear for the programming cams 15–33 inclusive and which meshes with a gear 57 (see Figs. 2 and 8) which is rigidly connected to a continuously rotating shaft 58. This shaft 58 is supported and driven in any conventional way. Thus, it is apparent that hollow shaft 14 and the programming cams 15–33 inclusive keyed thereto are intended to rotate continuously during operation.

Readout drum 5 is advanced in discreet unitary steps by the alternate movement of the drive levers 39 and 48 which impart reciprocal rotation to the drum advancing gears 6 and 7, respectively, when the said drive levers are actuated by their respective continuously rotating programming cams 18 and 27. Drive levers 39 and 48 are normally held out of operative engagement with their respective programming cams 18 and 27 by interposers 59 and 60 attached to an armature 61 (see Fig. 5) unless said armature is moved counterclockwise about its pivot 62 as viewed in Fig. 2 by the energization of electromagnet 63 which causes said interposers to release their respective drive levers in a manner more fully described below and permits said levers 39 and 48 to be actuated by said cams 18 and 27.

The energization of electromagnet 63 is effected as will be hereinafter described.

In Fig. 3 readout drum 5 is shown to have depressions 65 in its outer surface 66. These depressions correspond to the binary code numbers as indicated in the projection of the readout drum surface shown in the chart of Fig. 4. The shaded areas in the latter chart represent the said depressions 65 and their longitudinal and circumferential positions on the surface 66. To properly orient the chart of Fig. 4 with the readout drum surface 66 of Fig. 3 the former should be shifted so that the arrows A in both figures point in the same direction.

The decimal number represented by the position to which the readout drum 5 has been advanced by drive levers 39 and 48 in the above described manner for any particular cycle is determined by nine sensing fingers 68–76 (see Fig. 3) which are integral parts of cam follower levers 41–47 inclusive, 49 and 51, respectively, and are disposed in a line along the length of readout drum 5 and in proximity thereto. There is one sensing finger for each binary code component which is listed along the right side of the chart in Fig. 4. During a "readout" portion of each cycle the above cam follower levers 41–47, 49 and 51, actuated by their programming cams 20–26, 28 and 30, respectively, cause their respective sensing fingers 68–76 to move against the adjacent surface 66 of readout drum 5 in a related time sequence and particular ones of said fingers to move into their related readout drum surface depressions 65 which represent the binary components of said decimal number. Such movement of any particular of said fingers 68–76 into its related depression 65 in readout drum surface 66 effects the closing of a particular one of respective electric readout switches 79–87 (see Fig. 14). These switches are located within the mechanism for operation in response to movements of respective of said fingers 68–76 and are connected in the electrical output circuit shown in Fig. 14. The closing of appropriate of said switches in this manner provides conduction paths for delivering electrical pulses externally of the counter in representation of said decimal number for purposes presently to be described.

Figure 16:
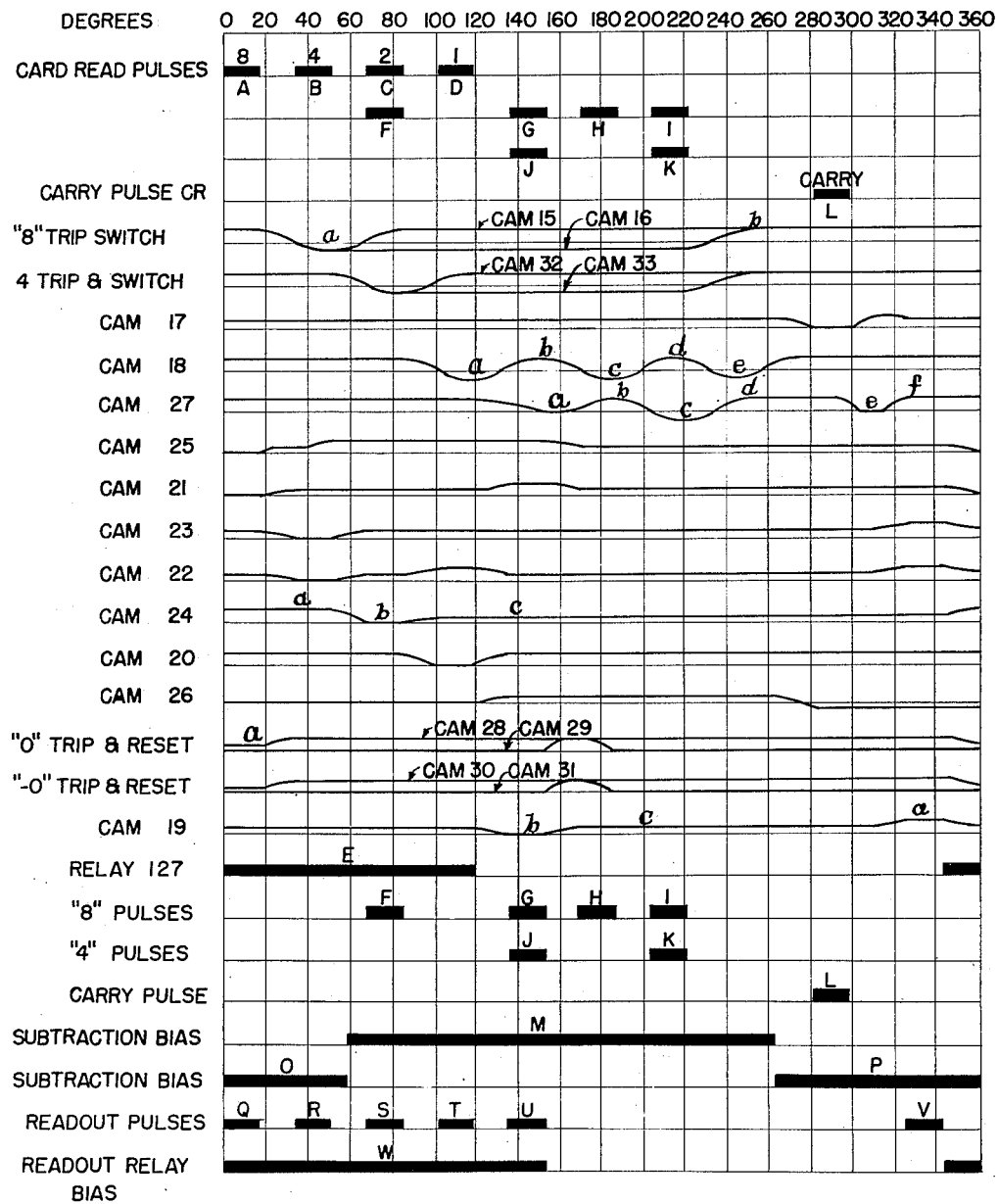
Fig. 16 is a time chart for the various cams and electrical pulses used in a counter embodying the present invention.

Referring to Figs. 2 and 16, the operation of drive levers 39 and 48 will now be described in greater detail. Fig. 2 shows drive lever 39 rotatably mounted on pivot 90. Said lever 39 has a gear sector portion 91 which meshes with readout drum advancing gear 6, the latter being rotatably mounted with ratchet coupling 8 on shaft 4 as mentioned above (see also Figs. 3 and 11). Drive lever 39 also has a cam follower member 92 which is urged by spring means 93 toward programming cam 18 which rotates continuously in a counterclockwise direction indicated by arrow B in Fig. 2.

With the position of the related parts as shown in Fig. 2 the spring means 93 maintains cam follower member 92 of lever 39 in contact with cam 18. A highpoint $d$ on cam 18 has just moved past follower member 92 and as the latter member moves toward low point $e$ in said cam 18, lever 39 is rotated about pivot 90 in a counterclockwise direction by spring means 93, causing gear sector portion 91 to rotate the advancing gear 6 in a clockwise direction. Such rotation of gear 6 does not cause any movement of readout drum 5 because of the slipping action of ratchet coupling 8 in that direction of rotation of gear 6. However, when cam follower member 92 moves from recess $e$ to high portion $f$ on cam 18, such movement imparts a clockwise motion to drive lever 39 about said pivot 90. This causes gear sector portion 91 to rotate advancing gear 6 counterclockwise and effects a corresponding rotation or advancement of readout drum 5 in the direction shown by arrow C. Thus, it is apparent that advancement of readout drum 5 is only effected when the cam follower member 92 is moving away from a low point $a$, $c$, or $e$ on cam 18.

Fig. 16 shows a development of the surface profile of programming cam 18. Each of the low points $a$, $c$ and $e$ on the surface of said cam 18 is of the same depth and corresponds to a rotational advancement of the readout drum 5 of two steps representing two decimal units. Thus, when all three above cam recesses have been traversed by said follower member 92 the said drum 5 has been rotationally advanced a total of six steps representing six decimal units.

Drive lever 48 operates in a similar fashion in conjunction with its programming cam 27 but referring to the development of the surface profile of said latter cam as shown in Fig. 16 it can be seen that the latter cam low points $a$, $c$ and $e$ are not of identical depths. Low points $a$ and $e$ on cam 27 have a depth which will effect an advance of readout drum 5 of one unit each, and low point $c$ has a depth which will effect an advance of said drum of two units. By comparing the above two cam surface profiles as shown in Fig. 16 it is apparent that the high and low points of cam 18 and of cam 27 are timed relative to each other so that the respective drive levers 39 and 48 controlled thereby will operate 180 degrees out of phase in advancing the readout drum 5. This arrangement permits the allocation of a minimum of time for advancing drum 5 the maximum number of steps in any cycle to represent the accumulation of a decimal digit (i. e. nine). Low point $e$ on cam 27 is to provide the one step advancement of the drum 5 needed for a carry if it arises.

From the foregoing explanation it can be seen that the counter mechanism employs an internal –2–, –1–, –2–, –2–, –2– code for advancing the readout drum 5 by drive levers 39 and 48. Thus, in one cycle of the programming cams 18 and 27, readout drum 5 can be advanced a total of 10 decimal units including a carry.

In order to control the advancement of readout drum 5 by drive levers 39 and 48 and to control the operation of an 8-trip switch lever 36, one of the programming cam controlled levers hereinbefore mentioned and a 4-trip switch lever 53 another of such levers, the counter electro-magnet 63, its armature 61 and the interposers 59 and 60 are arranged as shown in Figs. 2 and 5. The said magnet 63 includes coil windings 97 and 98 wound respectively on a pair of cores 99, 100 whose longitudinal axes are aligned with a variable air gap 101 between the cores. This air gap may be varied by an adjustment screw 102. The coil winding 97 on core 99 includes an operating coil 97a and a bias coil 97b (see Fig. 13). The coil winding 98 on core 100 includes an operating coil 98a and a bias coil 98b. In the circuit arrangement to be described, the operating coil 97a is used in conjunction with the bias coil 98b and the operating coil 98a is used in conjunction with bias coil 97b. Two sets of bias and operating coils are provided because it is necessary during certain portions of a subtraction cycle to alternate from one set to the other as will presently be explained.

An end portion 103 of armature 61 extends into the gap 101 between the two cores 99 and 100, the armature 61 being movable about its pivot 62 in response to the energization of particular of said magnet coils, and the other end 104 of said armature supports spring-biased interposers 59 and 60. Interposer 59 is engageable with the cam follower members 92 and 105 of drive lever 39 and the 8-trip switch lever 36, respectively (see Fig. 5). Interposer 60 is similarly engageable with the cam follower members 106 and 107 of drive lever 48 and the 4-trip switch lever 53, respectively. When a particular cam follower member 92, 105, 106 or 107 is in an engaged position relative to its interposer 59 or 60, the said follower member is thereby held out of operative contact with its related programming cam and cannot perform its particular function.

The home position of end portion 103 of the armature 61 depends on which of the said bias coils, 97b or 98b, is being energized. Bias coil 98b, when energized, pulls and holds the armature end portion 103 down against core 100 as viewed in Fig. 2 when no energizing pulse is being received by operating coil 97a (see also Fig. 13). An energizing pulse applied to operating coil 97a will then pull armature end portion 103 upwards since energization of the operating coil exerts a stronger pull on the armature end portion 103 than does energization of its corresponding bias coil.

When the armature 61 is in a home position as shown in Fig. 2 (i. e. with bias coil 98b energized), both interposers 59 and 60 at the start of a cycle will be in an engaged position with their related cam follower members 92, 105 and 106, 107, respectively, in a manner as shown in Fig. 7. Therefore, unless operating coil 97a is energized, none of the said latter cam follower members will be allowed to move into operative contact with its related programming cam. Consequently, the readout drum 5 will not be advanced because drive levers 39 and 48 will not be able to move in response to their cams 18 and 27 and the trip switch levers 36 and 53 will not be operated in a manner to be described. Unless a special situation occurs which will be explained later, when operating coil 97a receives an energizing pulse and consequently pulls and holds armature end portion 103 momentarily upward as viewed in Fig. 2, such action causes movement of armature 61 about pivot 62 so that armature end 104 moves downward and normally interposers 59 and 60 move out of engagement with both of their respective cam follower members and all four of said members (92, 105, 106 and 107) are in operative contact with their related programming cams (18, 15, 27 and 32). The operating coil 97a is energized only momentarily to permit any particular of the said four cam follower members whose programming cam is just presenting a low point to it to start moving into the low point as mentioned above. When the said coil 97a is de-energized, the armature 61 returns to its initial home position and the other three cam follower members are re-engaged by the interposers and held inoperative again, and when the fourth cam follower member moves away from the particular low point in its program cam its related interposer re-engages it in an inoperative position.

A special situation may occur when coil 97a is energized so that a particular cam follower will not be released by its interposer when the others are momentarily released in the above fashion. For example, referring to the profiles for cams 18 and 27 in Fig. 16, it is seen that when cam 27 presents high point b to its cam follower 106 (see also Fig. 5), cam 18 has low point c adjacent its cam follower 92. Consequently, if no energizing pulse had been delivered to coil 97a at approximately the 150 degree point of rotation to release cam follower 92 and let it move into its programming cam low point c, and if coil 97a is energized at approximately the 190 degree point of rotation to cause interposer 60 to release cam follower 106, spring means 93 (see Fig. 2) urges cam follower member 92 against interposer 59 with additional pressure, since the said cam follower 92 moves slightly toward said low point c in cam 18. As a result, cam follower 92 remains latched to interposer 59 when interposer 60 releases cam follower 106. Otherwise the release of cam follower 92 at that time would permit the latter to move into low point c in cam 18 and cause an erroneous advance of readout drum 5. In this manner the interposers selectively control the action of cam follower members 92, 105, 106 and 107 in response to the properly timed energization of magnet coil 97a.

At this point the manner in which electrical pulses are received by the counter input circuit and are transmitted to the magnet operating coil 97a will be explained with reference to Fig. 13.

Figure 13:
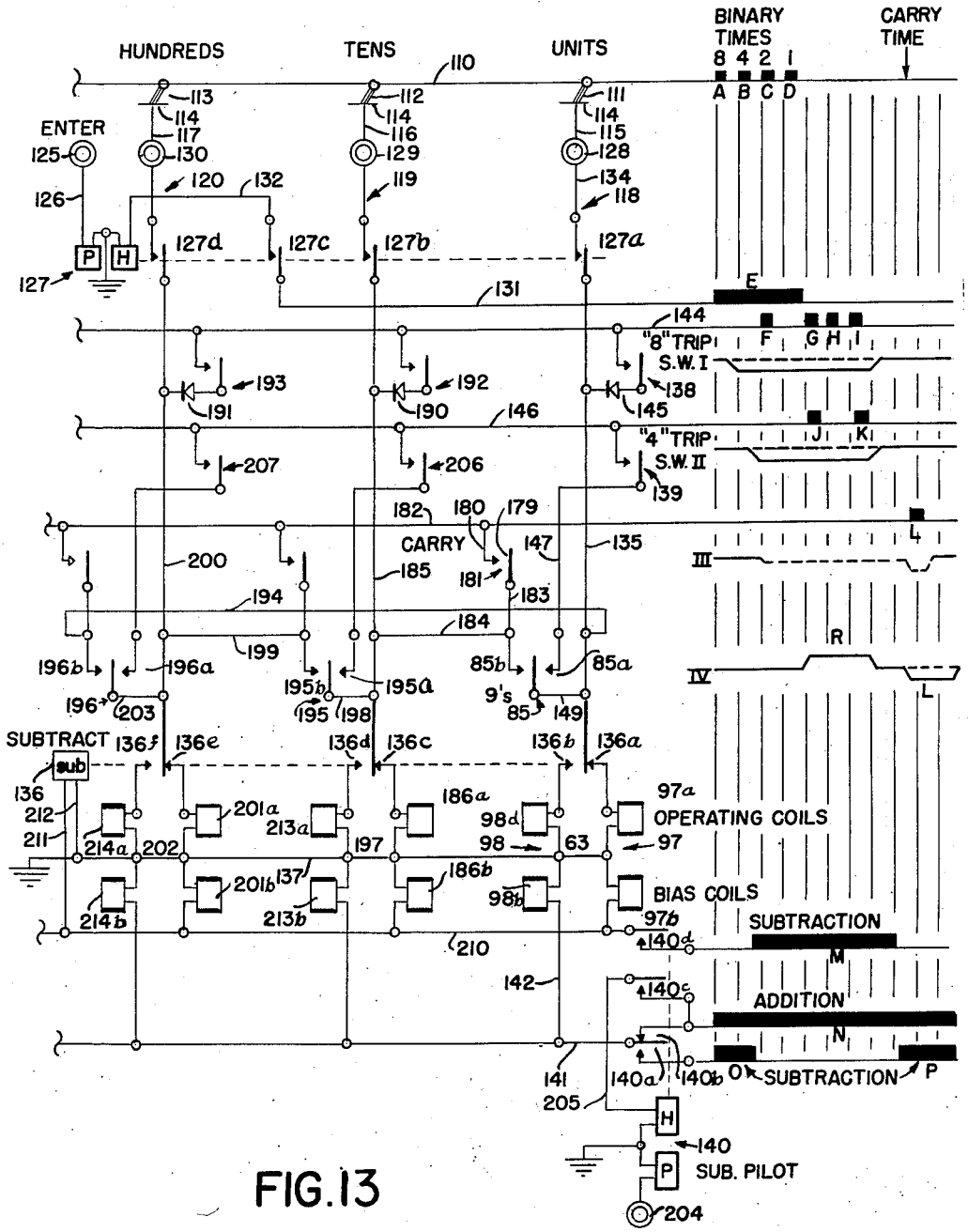
Fig. 13 is a simplified schematic diagram of the electrical input circuit for three counters of a typical group of counters embodying the present invention.

Fig. 13 shows the electrical input circuits for three separate counters interconnected to provide a counter group capable of representing three digits, for example, units, tens and hundreds in the decimal system. It is to be understood at the outset that other counters representing higher order digits may be similarly connected into the circuit as indicated at the left of Fig. 13. It should be noted that the input circuit for each particular counter is separate and distinct from the input circuits of the other counters. That is to say, coded electrical pulses are received by the input circuit of each counter at the same time pulses are received by the input circuits of the other counters, but each counter receives pulses corresponding to a different decimal digit. The primary significance of the electrical interconnection of the input circuits as shown is that electrical pulses generated internally for the counter group may be supplied to all counters of the group from a common source, and that for purposes of performing arithmetical "carry" operations, electrical conduction paths must be provided from one counter input circuit to another.

On the right-hand side of Fig. 13 is a time chart showing the relationship of electrical pulses A to P which are or may be utilized by the electrical circuits shown to the left, as well as the positional profiles I to IV of certain electrical switches built into each counter, said profiles being horizontally aligned with their related switches to show the operation of the latter in relation to each other and to the above mentioned pulses. The dotted lines in said profiles show the position of the switch in the absence of its condition of operation during a given cycle. The solid lines beneath said dotted lines indicate the position of the switch when its particular condition of operation is present during a particular cycle. All other solid lines show the switch position which occurs unconditionally during each cycle. The entire horizontal width of this time chart represents one cycle of operation, i. e., one revolution of the programming cams 15–33 mentioned above (see Fig. 3), or in other words the accumulation and reading out of one decimal number by the counter group.

Electrical conductor 110 is connected from a positive voltage supply (not shown) to electric card scanning brushes 111, 112 and 113 which scan the units, tens and hundreds columns respectively of a perforated record card 114 as the said record card is moved by any means well-known in the art past the said brushes. When any of the said brushes 111–113 locates a hole in the card it momentarily connects the positive voltage conductor 110 to the respective of the input conductors 115–117 inclusive, thereby delivering to the particular of the latter conductors a positive voltage pulse. There is one of said brushes 111–113 for each digit counter in the counter group. The card perforations presented to each brush are staggered so that as the particular column of the said record card 114 is moved past the related brush the card perforations in that column will cause electric pulses representing the binary components of the particular digit represented in the said card column to be sent to the particular of said input conductors 115–117 as the case may be in the binary time sequence –8–, –4–, –2–, and –1–, as represented by pulses A, B, C and D, respectively. The pulses A, B, C and D are identical in all respects except that the time a particular of said pulses is generated in the above mentioned fashion determines the particular binary component the pulse is intended to represent.

Considering only the units counter input circuit 118 in Fig. 13, but realizing that the tens counter input circuit 119 and the hundreds counter input circuit 120 can be receiving pulses from their respective electric scanning brushes 112 and 113 during the same period of time, the general operation is as follows.

Figure 14:
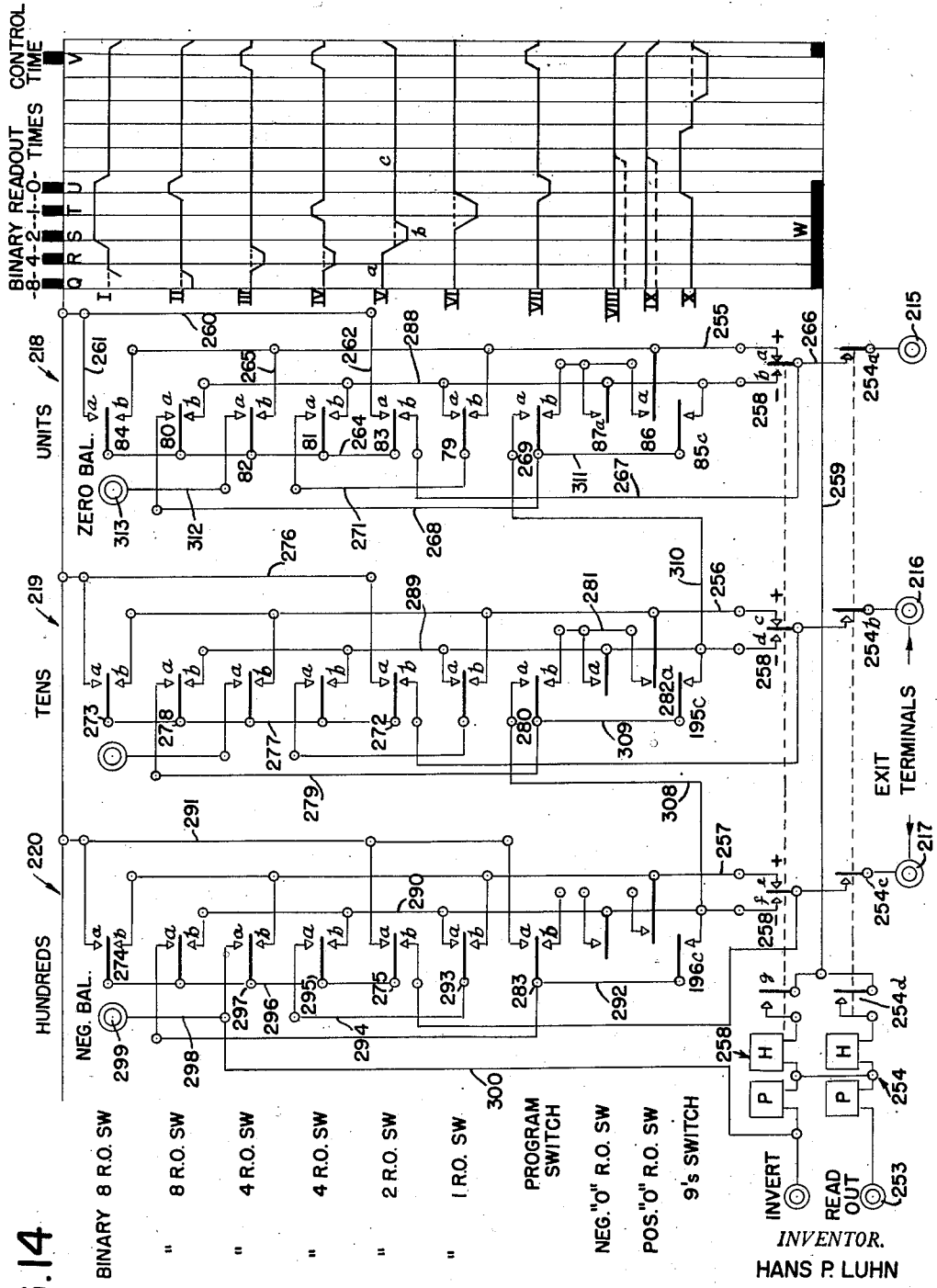
Fig. 14 is a simplified schematic diagram of the electrical output circuit for the same three counters represented in Fig. 13.
Figure 15:
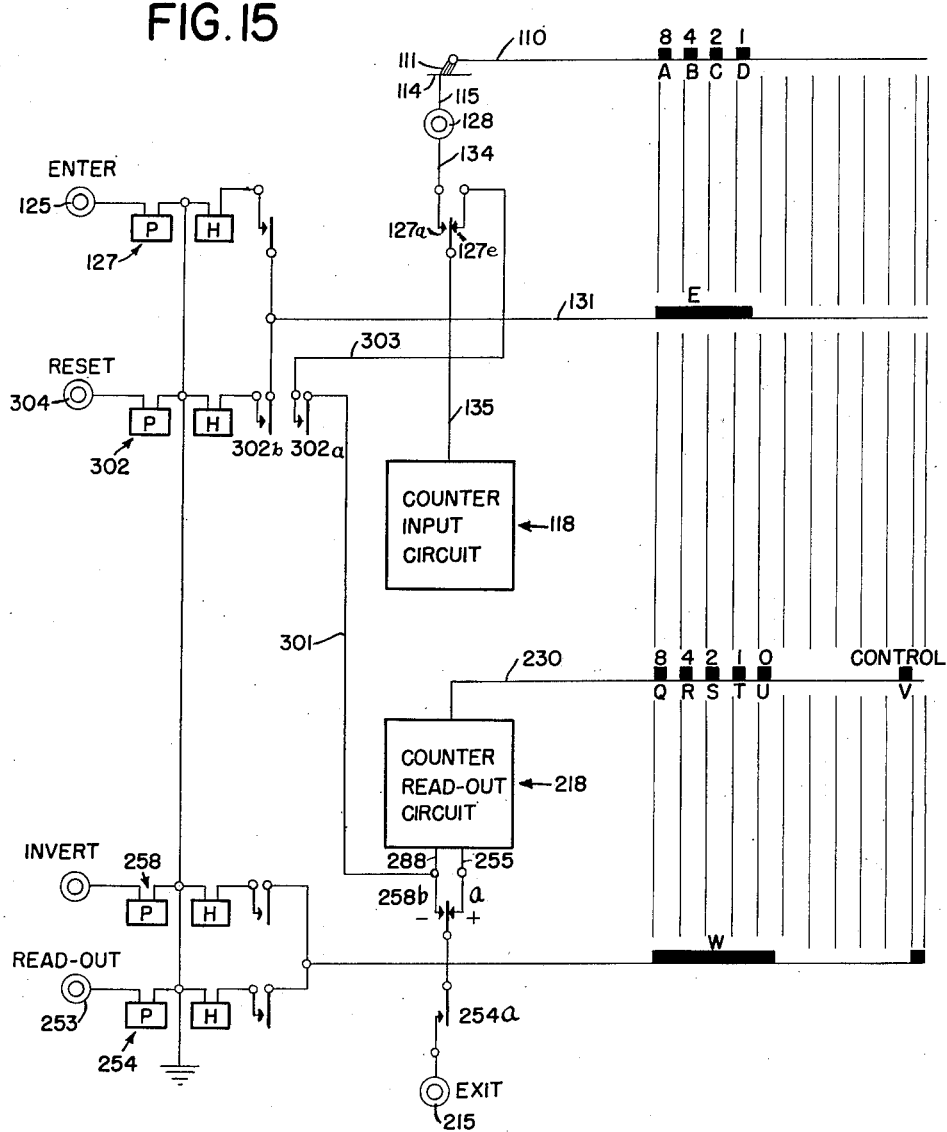
Fig. 15 is a block diagram showing the re-setting mechanism for a typical counter embodying the present invention.

Before the receipt of any binary code pulses A, B, C or D from the record card being scanned, an electrical control pulse from an external source (e. g. from an electric brush similar to the above type scanning another area of the card and locating a perforation in the card) is delivered to an input terminal 125 and passes along conductor 126 to energize the pickup coil P of a relay 127 which thus closes the relay contacts 127a–d thereby providing conduction paths from entrance terminals 128–130 into the counter input circuits 118–120 respectively. The relay 127, as well as all other relays used in the electrical circuits of the counter group as shown in Figs. 13, 14 and 15, are separate entities and no part of the structure of any of the individual counter mechanisms. The closing of relay contacts 127c permits a voltage pulse E to be fed along conductor 131, through closed contacts 127c and along conductor 132 to energize holding coil H of said relay 127 so that relay contacts 127a–d will remain closed during that period of the cycle when binary code pulses –8–, –4–, –2–, and –1– can be received from the record card.

Electric pulses E—M and O—P are provided for the counter group by an externally-located pulse generating mechanism of any desirable kind. The pulse generating mechanism could for example be composed of a plurality of switching mechanisms, similar to the program switch mechanism 133 shown in Fig. 11, subsequently to be described in detail. Pulses E—M and O—P are generated in the time relationship shown in Fig. 13 and are fed along various of the conductors shown in Fig. 13 to the input circuits of each counter where the appropriate of said pulses are to be utilized by the particular circuits as hereinafter described.

After the relay 127 has been energized in the above described manner, all of the counter input circuits are ready to receive electric pulses from the card 114 being scanned, and the operation of the units input circuit 118 will now be described in detail.

In this invention cognizance is taken of the fact that when a decimal notation is represented by a binary 8–4– 2–1 code, neither the –8– and the –4– nor the –8– and the –2– will be found on the record card in the same binary group in a column representing one digit of a decimal number, since no decimal digit will be higher than nine and consequently no group of binary components representing that decimal digit will add up to more than nine. In other words, the only other binary component which could ever appear in the same group with a binary –8– is a binary –1–.

The fact that either a binary –8– or a binary –4– might have appeared on the card in the units column can be noted at the time the particular related electrical pulse appears at entrance terminal 128 of the units counter input circuit 118, but the actual addition of values to the units counter readout drums 5 corresponding to such –8– or –4– can be performed later on in the cycle of operation, thus delaying for the time being any movement of the counter mechanism, affording advantages which will be subsequently pointed out.

If a perforation occurs in the units column of the record card being scanned to represent a binary –8–, then at so-called binary –8– time an electrical card read pulse A will be generated by the momentary contact of positively connected brush 111 through the said perforation to conductor 115. Pulse A passes through units entrance terminal 128, along conductor 134, through closed contacts 127a of relay 127, along conductor 135, through normally closed contact 136a of de-energized subtract relay 136, through operating coil 97a of electromagnet 63 (Fig. 2) and along conductor 137 to ground. The resulting energization of the operating coil 97a causes "8" trip switch 138 to be closed in a manner subsequently to be described. The units readout drum 5 is not advanced at this time.

Likewise if instead of pulse A being generated in the units input circuit 118 as above, a perforation representing a binary –4– appears on the card, then at binary –4– time, a card read pulse B is generated in a similar manner, and passes through the identical electrical circuit just described and as will be described, also causes the "4" trip switch 139 to be closed. Once again the units readout drum 5 remains stationary during this time.

If a perforation appears in the units column of the record card to represent a binary –2– then at binary –2– time an electrical card read pulse C is generated in the manner above described and passes through the same electrical circuit to energize operating coil 97a of the counter electromagnet 63. Referring to Fig. 16 it can be seen that at binary –2– time when card read pulse C energizes operate coil 97a, cam follower member 92 of drive lever 39 is just approaching low point a on its programming cam 18, and so interposer 59 then releases the said cam follower member 92 (see also Fig. 2). The subsequent movement of member 92 out of low point a in cam 18 will cause the advancement of units readout drum 5 two decimal units by drive lever 39 as previously explained. Thus a two has been entered in the units counter directly in response to card read pulse C.

If a perforation appears in the units column of the record card to represent a binary –1–, then at binary –1– time an electrical card read pulse D generated similarly as the previous card read pulses passes through the same electrical circuit to energize operating coil 97a. Referring to Fig. 16, it is seen that at binary –1– time programming cam 27 is just ready to present low point a to cam follower member 106 on drive lever 48. Therefore the energizing of coil 97a causes interposer 60 to release the said follower member 106 and permit it to move into low point a with further rotation of cam 27. As the said follower member 106 subsequently moves back out of said low point a in cam 27, such motion will cause drive lever 48 to advance units readout drum one decimal unit.

By reference to the time relationship of the receipt of card read pulses A, B, C and D, and the low points a in programming cams 18 and 27, it is seen that the readout drum 5 remains stationary until just after binary –1– time (i. e. the receipt of card read pulse D). The first movement of the readout drum 5 in response to the said card read pulses is the advance of said drum two units in response to pulse C at binary –2– time, since cam follower 92 on drive lever 39 starts out of the low point a in its programming cam 18 just after binary –1– time. No movement of the readout drum 5 is caused in response to a binary –8– pulse A or a binary –4– pulse B until after binary –1– time because as mentioned above the receipt of such A or B pulses result merely in the energizing of coil 97a to close switches 138 or 139 respectively.

After binary –1– time, voltage pulse E terminates and consequently enters relay 127 becomes deactivated, opening relay contacts 127a–d. Any electrical pulses fed to the counter input circuit after this time in the cycle will be derived from an external source and not from the record card.

If a binary –8– had been stored at binary –8– time it should be realized as pointed out above that no binary –2– pulse C from the card will occur in the units counter input circuit for that same cycle, so it is possible to start feeding the previously stored binary –8– into the units counter at binary –2– time. Referring to the time chart of Fig. 13 externally generated electrical pulses F, G, H and I are delivered along conductor 144 from a cam-actuated electric switch (not shown) in the time sequence as shown (see also Fig. 16) to cause the advance of readout drum 5 eight decimal units. Each of the pulses F, G, H and I thus represents two units.

At binary –2– time pulse F passes along conductor 144, down through closed 8 trip switch 138, through unidirectional current flow device 145, to conductor 135, down conductor 135, through normally closed contacts 136a of the de-energized subtract relay 136, through operate coil 97a of units counter electromagnet 63, and along conductor 137 to ground. This pulse causes the readout drum 5 to be advanced two units in the identical manner described for the binary –2– pulse above. Skipping binary –1– time (if a binary –1– pulse is received from the card it would cause the advance of the readout drum 5 one unit at this time) then the other three pulses G, H and I in that sequence are delivered along the same circuit as pulse F and similarly reach causes readout drum 5 to be advanced two units. By referring to the profile of programming cams 18 and 27 in Fig. 16 it can be seen that pulse F is associated in time with low point a on cam 18, pulse G with low point c on cam 18, pulse H with low point c on cam 27, and pulse I with low point e on cam 18. Consequently, since cam 18 actuates drive lever 39, drive lever 39 advances the readout drum 5 two units in response to pulse F, and two more in response to pulse G. Drive lever 48 then advances drum 5 two units for pulse H, and finally drive lever 39 advances drum 5 the two final steps in response to pulse I.

If instead of receiving a binary –8– pulse, a binary –4– pulse had been received and stored at binary –4– time then that will result in pulses J and K representing two units each being delivered from an external pulse generating source (not shown) at the time shown in Fig. 13 (see also Fig. 16). Each of said latter pulses at its proper time passes along conductor 146, down through the closed contacts of the "4" trip switch 139 (said contacts having been closed since binary –4– time in the manner previously described), along conductor 147, through closed contact 148a of 9's switch 148 (see operational profile IV to the right of said 9's switch), along conductor 149, down through normally closed contact 136a of de-energized subtract relay 136, through operating coil 97a of electromagnet 63, and along conductor 137 to ground. In this manner drive lever 39 advances readout drum 5 two units for each pulse J and K. Low points c and e on programming cam 18 impart the required motion to said drive lever 39 for the above purpose.

ADDITION

Assume that a record card punched in the above binary 8–4–2–1 code has the –8– and –1– holes punched and is to be read by the units circuit electric card scanning brush 111 (see Fig. 13) and the units readout drum 5 advanced nine decimal units in response thereto. Any particular one of the pulses A, B, C and D will be delivered to the units input circuit 118 only if a hole appears in the units column of the said card at the appropriate time during the scanning by said brush 111. Thus in the present example the –8– and –1– pulses will be delivered at their respective times as indicated in Fig. 13.

Assume that an external program pulse has already energized relay 127 and closed the relay contacts 127a–d. Subtract pilot relay 140 is de-energized and so direct current bias voltage N is fed through closed contact 140b of subtract relay 140, along conductor 141, up conductor 142 through bias coil 98b and along conductor 137 to ground. This maintains armature 61 of electromagnet 63 in the home position as shown in Fig. 2 against magnet core 100 in the absence of electric pulses in input circuit 118 to energize operating coil 97a. At binary –8– time the –8– pulse will pass along conductor 115, through the units circuit entrance terminal 128, along conductor 134, through the closed contact 127a of the relay 127, down conductor 135, through the normally closed contact 136a of de-energized subtract relay 136, through operating coil 97a of the units counter electro-magnet 63, and along conductor 137 to ground. The pulse thus energizes the operating coil 97a and effects the closing of the "8" trip switch 138 which will now be described.

Fig. 7 shows the "8" trip switch mechanism. "8" trip switch lever 36 is rotatably mounted on the pivot 90 and has its cam follower member 105 movable into engagement with continuously rotating programming cam 15 by the urging of spring 150. The said cam follower member 105 has a notch 151 which is engageable with interposer 59 connected to armature 61 of units counter electro-magnet 63. The engagement of the said notch 151 by said interposer 59 locks cam follower member 105 in an inoperative position relative to said programming cam 15. Lever 36 also has an arm portion 152 which slidably bears against one arm 153 of a two-armed lever 154 rotatably mounted on shaft 4. The other arm 155 of said two-armed lever 154 is movable into latching contact with arm 156 of multi-pronged lever 157, said latter lever being rotatably mounted on pivot 90 adjacent to "8" trip switch lever 36. Tension spring 158 connected at one end to the said arm 156 and at its other end to the said arm 155 biases the latter two arms into contact with one another. Multi-pronged lever 157 also has an electric switch-closing member 159 and a resetting cam follower member 160, the latter member being movable into operative contact with continuously rotating programming cam 16 which is adjacent cam 15 on the same shaft 14.

With bias coil 98b energized at the beginning of the cycle the cam follower member 105 of "8" trip switch lever 36 is held inoperative relative to its programming cam 15 by the engagement of notch 151 in cam follower member 105 with interposer 59. During the same time arm 155 of two-armed lever 154 and arm 156 of multi-pronged lever 157 are held in latched contact with one another by spring 158, and resetting cam follower member 160 of said latter lever 157 is thereby held out of operative contact with its programming cam 16.

The conduction of the binary –8– pulse over the electrical path defined above energizes operate coil 97a of electro-magnet 63 which pulls end portion 95 of armature 61 upward toward core 99 as viewed in Fig. 2 and interposers 59 and 60 (see also Fig. 5) release their respective cam followers 92, 105 and 106, 107, Fig. 16 shows that at binary –8– time the "8" trip programming cam 15 is just presenting a low point a to its cam follower member 105 (see Fig. 7). Consequently, when released by interposer 59, cam follower member 105 moves into the said low point *a* of cam 15. Such movement of member 105 causes lever 36 to rotate counter-clockwise about pivot 90 as viewed in Fig. 7 and arm portion 152 of the lever 36 to bear upward against arm 153 of two-armed lever 154 and cause the latter to move clockwise against the tension of spring 158 so that its other arm 155 moves out of latching contact with arm 156 of multi-pronged lever 157. Multi-pronged lever 157 is consequently rotated clockwise about pivot 90 by the tension of spring 158 until resetting cam follower member 161 of said lever 157 is moved into operative contact with continuously rotating resetting cam 16. At the came time switch-closing member 159 moves electric contact member 161 against stationary electric contact 162 thus closing "8" trip switch 138.

Referring to Fig. 16 it is seen that this switch remains closed until later in the cycle of rotation when resetting cam 16 presents its high point *b* to cam follower member 160 and thus rotates multi-pronged lever 157 counter-clockwise, which causes switch closing member 159 to move contact 161 away from said stationary contact 162 thereby opening "8" trip switch 138. The latter movement of lever 157 moves arm 156 back into latched contact with arm 155 of two-armed lever 154. Cam follower member 105 of "8" trip lever 36 moves back out of low point *a* on its programming cam 15 shortly after binary −2− time (see Fig. 16) and its notch 151 re-engages interposer 59 at that time. Therefore, the resetting action of the resetting cam 16 just described restores the "8" trip switch mechanism to its original condition for the start of the next succeeding cycle of operation.

The "4" trip switch 139 (see Fig. 13) and its associated parts are identical to those described above for the "8" trip switch 138, but the "4" trip and reset cams 32 and 33 whose profiles are shown in Fig. 16 indicate that the "4" trip switch 139 is operable at a slightly different time in the cycle in order that it will be properly controllable by the binary −4− pulse. In other respects the operation of the said "4" trip switch 139 and "8" trip switch are identical.

Continuing the addition, having now stored the −8− pulse by the above described closing of the "8" trip switch 138, no pulse is delivered to the units input circuit 118 at binary −4− time since no corresponding hole appeared in the units column of the record card. Consequently during this particular cycle the "4" trip switch 139 is not closed. At binary −2− time, also, no pulse is generated by the card, but an electrical pulse F generated externally as above explained is delivered at this time along conductor 144 through the closed "8" trip switch 138, through one-way current-flow device 145, down along conductor 135, through the closed contact 136*a* of the de-energized subtract relay 136, through operating coil 97*a* of units counter electro-magnet 63, along conductor 137 to ground. In passing through operating coil 97*a* the said pulse energizes the latter coil so that end portion 103 of armature 61 is pulled toward the said coil 97*a* and away from the home position next to bias coil 98*b* (see also Fig. 2), and drive lever 39 is thereby released by its interposer 59 to respond to low point *a* in the related programming cam surface 18 and consequently advance readout drum 5 two decimal units in the manner previously explained.

Before a series of operations are to be carried out with this counter group the readout drums (only the units readout drum 5 is shown, e. g. Fig. 2) for each particular digit counter is reset to a position representing a decimal nine instead of zero because by so doing the presence of negative numbers in the counter group may be detected if the particular negative number is at least one digit smaller than the number of counters. Thus, a nine standing in the highest digit counter (i. e. the "hundreds" counter in the present embodiment disclosed) can be used to designate the presence of a negative number of not more than two digits in the counter group.

Starting with the counters set at nines, if a −2− is then to be added to the units counter, as in the present example, it will necessitate a carry of −1− from the units counter circuit 118 to the tens counter circuit 119, and then to the hundreds counter circuit 120. The "around end" carry back to the units counter circuit 118 from the hundreds counter circuit 120 will be taken care of later in the cycle. Any carries arising in the counter group are added in by advancing the appropriate readout drums after all of the normal addition is completed. Thus, the carry arising in the units counter 118 from the addition of the above −2− to the −9− to which the readout drum 5 had been set before the start of this cycle must be stored until carry time.

The carry trip switch lever 165 and associated parts are shown in Fig. 6 (see also Figs. 3 and 13). Cam 166 is mounted on shaft 4 adjacent to the readout drum advancing gear 6 (see Fig. 3) for rotation with the readout drum 5. An enlarged view of said cam 166 is shown in Fig. 12 with the decimal units marked off on its circumference for purposes of illustration. Lugs 167 and 168 are located on the periphery of cam 166 at diametrically opposite points between position of said cam for nine and zero. When units readout drum 5 is advanced from a position representing a decimal nine to a position for zero, cam 166 rotates in step with said drum 5, and lug 167 or 168 (whichever is in position) depresses end portion 169 of carry trip arm 170 which rotates in a clockwise direction as viewed in Fig. 6 about the pivot 90.

Pin 171 on said arm 170 slidably engages slot 172 in lever member 173 which is rotatably mounted on shaft 4, and the above clockwise rotation of arm 170 imparts through pin 171 and slot 172 a counterclockwise rotation to member 173 and causes latch portion 174 of the latter member 173 to move out of a locked position relative to latch member 175 of carry trip lever 38. Carry trip lever 38 is thus free to rotate about its pivot 90. Spring 176 maintains cam follower member 177 on said lever 38 in operative contact with continuously rotating programming cam 17 on shaft 14.

Just prior to carry time (see Fig. 16) during the cycle programming cam 17 presents a low point *a* to cam follower member 177 and the movement of said member into said low point causes carry trip lever 38 to rotate counterclockwise. During such movement, switch closing member 178 on said lever 38 moves movable electrical contact 179 against stationary contact 180 and thus effects closure of carry switch 181 (see also Fig. 13, switch profile III).

At carry time externally generated electrical carry pulse L is delivered along conductor 182 and passes through the closed carry switch 181 of the units counter and passes along conductors 183, 184 and 185, through closed contacts 136*c* of de-energized subtract relay 136, passes through and energizes operating coil 186*a* of the tens circuit electro-magnet, and then passes along conductor 137 to ground. The energization of the latter electro-magnet coil 186*a* causes the tens circuit readout drum (not shown) to be advanced one decimal unit corresponding to the carry which had arisen in the units circuit. This one decimal unit advance occurs because the low point *e* on the cam of the tens unit counter like cam 27 in the units counter effects a single step advance of the tens unit readout drum through actuation of a drive lever corresponding to drive lever 48 (see Figs. 3 and 16).

After the carry operation has been accomplished the units counter latch member 175 of carry trip lever 38 and latch portion 174 of lever member 173 are reset to their original locked position relative to one another by the action of cam follower member 177 riding up on reset high point *b* on programming cam 17. Such movement of the member 177 rotates lever 38 in a clockwise direction as viewed in Fig. 6, moving latch member 175 into locking engagement with latch portion 174 of lever member 173, which latter member is urged clockwise about shaft 4 into such engagement by the combined action of spring 187 connecting said lever 38 and arm 170, and pin 171 and slot 172 interconnecting said arm 170 and said member 173. During this resetting movement switch closing member 178 moves movable electrical contact 179 away from stationary contact 180 and thereby opens the units carry switch 181 (see also Fig. 13).

At binary −2− time in the present example, therefore, the advance of the units readout drum 5 in response to the receipt of electrical pulse F causes the carry mechanism to store the carry by closing carry switch 181. At binary −1− time the presence of a −1− hole in the units column of the record card causes a −1− pulse D to be delivered along units input conductor 115, through entrance terminal 128, along conductor 134, through closed contact 127a of relay 127, along conductor 135 to energize operate coil 97a. Since programming cam 27 (Fig. 2) is just presenting low point a to cam follower member 106 of drive lever 48, the release of the latter member 106 by interposer 60 in response to binary −1− pulse D causes the advance of units readout drum 5 by said lever 48 one decimal unit. The units counter readout drum 5 has been advanced a total of three decimal units since the start of the present cycle.

Since "8" trip switch 138 has been closed since binary −8− time, as the binary −1− pulse D passed along conductor 135 it could have been fed back up through the closed "8" switch and passed along conductor 144 to any closed "8" trip switch of another counter circuit causing an erroneous advance of the readout drum in the latter circuit. To avoid such occurrences, rectifier or one-way conducting devices 145, 190 and 191 are connected to the units, tens and hundreds circuits "8" trip switches 138, 192 and 193 respectively. These rectifiers permit current flow in one direction only, namely, from conductor 144 through the "8" trip switch 138 and along conductor 135 to the units counter electro-magnet 63, and along the corresponding paths in the other counter circuits, and block current flow in the reverse direction.

After binary −1− time the relay 127 is deactivated by the cessation of the pulse E applied to its holding coil H.

Referring to Fig. 13 there still are three externally generated electrical pulses G, H and I to be delivered to electro-magnet 63 to complete the addition of the binary −8− to the units counter readout drum 5. The first of these three pulses, pulse G, delivered at the time in the cycle shown in Fig. 13 and Fig. 16, will pass along conductor 144, through the closed "8" trip switch 138 of the units counter circuit 118, through rectifier 145, along conductor 135, through the closed contact 136a of de-energized subtract relay 136, through operating coil 97a of the units counter electro-magnet 63, and along conductor 137 to ground. Energizing of coil 97a at this time causes the release of cam follower member 92 by the interposer 59 and the consequent movement of said member 92 into and out of low point c of continuously rotating programming cam 18. This actuates drive lever 39 to advance the units readout drum 5 two decimal units. Following the identical electric circuit, the next electrical pulse H will cause drive lever 48 to advance the readout drum 5 two additional decimal units in response to low point c in programming cam 27. The third pulse I will cause the advance of the said drums two more decimal units by drive lever 39 in response to low point e on programming cam 18.

Thus after this last operation the number nine represented by holes punched into the units column of the card has been entered into the units counter circuit 118. Ignoring the carry the counter group of three digit counters should now stand at 998 (999+9), assuming that no holes were punched in the tens digit and hundreds digit columns of the card and consequently that no pulses were delivered to the electro-magnets 197 and 202, respectively, of the tens or hundreds counters during the preceding part of this cycle.

At carry time there are two particular operations to be performed to complete the addition of a nine to the counter group (see Fig. 13) which stood at 999 at the beginning of the present cycle. The counters now stand at 998 and so there must be a carry of one from the units counter circuit 118 to the tens counter circuit 119, and one from the tens to the hundreds counter circuit 120, as well as an "end around" carry from the hundreds counter circuit 120 back along conductor 194 to the units counter circuit 118, thus completing the present addition and leaving the counter group standing at 009 as desired.

To accomplish the above carry operations it will be remembered (see Fig. 6) that at binary −2− time the units carry trip switch mechanism was set for subsequent operation at carry time in response to cam 17 by the rotation of cam 166 from nine through zero. Therefore, immediately before carry time in the cycle recess −a− in programming cam 17 actuates trip switch lever 38 to effect the closure of the units carry trip switch 181 (see profile III in the time chart, Fig. 13). At the same time contact 195b of the tens counter circuit 9's switch 195 is closed (see profile IV) since the latter counter stands at the number nine. A program cam in the tens counter similar to cam 26 causes such closure as will be hereinafter described. Likewise, contact 196b of the hundreds counter circuit 9's switch 196 is closed at this time in similar manner.

At carry time the externally generated carry pulse L passes along conductor 182, down through the closed units carry switch 181, along conductor 183, across conductor 184 to the tens circuit 119, down conductor 185 in the latter circuit, and then the pulse goes in two directions. It passes through the closed contact 136c of the de-energized subtract relay 136, through operating coil 186a of the tens circuit electro-magnet 197, and along conductor 137 to ground. This energizing of coil 186a causes the tens circuit readout drum (not shown) to be advanced one decimal unit from nine to zero. The carry pulse L also passes from conductor 185 along conductor 198, up through the closed contact 195b of the tens circuit 9's switch 195, along conductor 199 to the hundreds circuit 120, down conductor 200 in said latter circuit and once again the said carry pulse L passes along two different paths. It passes down through the closed contact 136e of subtract relay 136, through operating coil 201a of the hundreds circuit electro-magnet 202 and along conductor 137 to ground. The energization of the said operating coil 201a causes the advance of the hundreds circuit readout drum (not shown) one decimal unit from nine to zero. Carry pulse L also passes from conductor 200 along conductor 203, up through closed contact 196b of the hundreds circuit 9's switch 196, along conductor 194 back to input conductor 135 in the units circuit 118, and down to energize operating coil 97a in a similar manner. The units counter readout drum 5 is thus advanced one decimal unit from eight to nine.

The above operations in response to carry pulse L result in the group of three counters standing at 009 at the completion of the cycle. The operations may be summarized stepwise as follows:

Counter group originally set to_____ 999
Then nine added to units counter_____ 2
                                                1
                                                2
                                                2
                                                2
                                              ———
Counter group setting after normal addition exclusive of carry_____ 998

| | |
|---|---|
| Carry operations | 1 |
| | 1 |
| Counter setting at end of cycle | 1 |
| | 009 |

SUBTRACTION

Assume that the next perforated record card to be read by electrical scanning brushes 111, 112 and 113 shown in Fig 13 has holes punched into it to represent a minus –6– in the units column, or in other words there is a hole punched in the card in an appropriate place to indicate a negative number, and the units column has a hole to represent a binary –4– and another hole to represent a binary –2–. This minus –6– therefore is to be subtracted from the 009 standing in the counter group. The method of subtraction employed in the particular device of this invention consists of adding the nines complement of the subtrahend to the minuend. The operation is as follows:

| | |
|---|---|
| Minuend | 009 |
| 9's complement of –6 subtrahend | 993 |
| | 002 |
| "End around" carry from hundreds counter to units counter | 1 |
| Result | 003 |

The record card containing a number to be subtracted from the number already standing in the counter group must supply an electrical subtract pulse necessary to operate the subtract relay 136. Such pulse can be generated for example by an electrical scanning brush similar to the type disclosed above which would scan a particular area of the record card and deliver an electrical pulse to subtract input terminal 204 upon locating the card hole indicating a negative number on the card. The latter pulse is delivered to input 204 in time to energize subtract relay 136 just before the start of the cycle during which a negative number is to be fed into the counter circuits from the card.

Since it is desired to enter the nines complement of the subtrahend to the counter group it becomes apparent that it is necessary to cause advancement of the readout drum of any particular counter only when no pulse is delivered to cause the advance of the readout drum of the said particular counter. This requirement brings into operation the second set of operating and bias coils 98a and 97b, respectively, in the units counter electro-magnet 63 and the corresponding coils in the tens and hundreds circuits 119 and 120.

Upon the delivery of the subtract pulse (not shown) from the record card being scanned to subtract pilot input terminal 204, pickup coil P of subtract pilot relay 140 is energized and contacts 140a, 140c and 140d of the said subtract pilot relay 140 are thereby closed. The direct current voltage N is delivered through closed relay contact 140c, along conductor 205, and through hold coil H of said relay 140 to ground, supplying holding voltage for relay 140 during an entire subtraction cycle. By comparing voltage pulses M, O and P, it is apparent that they cause a shift in the home position of armature 61 of units counter electro-magnet 63 (see also Fig. 2) during a subtraction cycle by shifting the energizing voltage from one bias coil 98b to the other bias coil 97b and subsequently shifting said voltage back to bias coil 98b. During the period of pulse O the bias coil 98b is energized, then during the period of pulse M bias coil 97b is energized, and finally during the period of pulse P bias coil 98b is once again energized. The home positions of the armatures (not shown) of the other counters are simultaneously shifted in the same manner, since pulses M, O and P are fed in parallel to all counter electromagnets via the conductors 141 and 210.

During the first part of the subtraction cycle, i. e. from just before binary –8– time until just after binary –4– time, normal bias is desired in the electro-magnets and the operation of operating coils 97a, 186a and 201a is required so that the respective "8" trip switches 138, 192 and 193 or "4" trip switches 139, 206 and 207 will be closed only if –8– or –4– pulses are received from the record card. Thus, referring to the units counter circuit as an example, it is necessary that interposers 59 and 60 (Fig. 5) will hold cam follower members 105 and 107 of "8" and "4" trip switch levers 36 and 53, respectively, inoperative unless corresponding record card generated pulses are received at units counter input circuit 118 (Fig. 13). The home position of end portion 103 of armature 61 (see Fig. 2) during this period is against magnet core 100 with bias coil 98b energized as in an addition cycle. To provide such normal bias, pulse O is delivered through closed contact 140a of subtract pilot relay 140, along conductor 141, along conductor 142, through bias coil 98b and along conductor 137 to ground. Contacts 136a, 136c and 136e of subtract relay 136 remain closed during this part of the cycle so that operating coils 97a, 186a and 201a of the units, tens and hundreds circuits 118, 119 and 120 may be operated normally as during an addition cycle.

Referring to the units circuit alone for purposes of simplification, from just before binary –2– time until just after the time during the cycle for the energization of electro-magnet 63 by externally generated pulses I or K, reverse or subtraction bias is required so that interposers 59 and 60 of armature 61 (see Fig. 5) will be held out of locking engagement with cam follower members 92 and 106 of drive levers 39 and 48, respectively, unless electrical pulses are received along conductor 135 (see Fig. 13) to energize operating coil 98a.

Reverse or subtraction bias is supplied by externally generated pulse M which is delivered during the proper part of the cycle through the closed contact 140d of subtract pilot relay 140, along conductor 210, through bias coil 97b of units counter electro-magnet 63, and along conductor 137 to ground, energizing said bias coil 97b to hold end portion 103 of armature 61 (see Fig. 2) in a home position against core 99 of said electro-magnet in the absence of electrical pulses energizing operating coil 98a. To connect latter said coil 98a into the circuit and disconnect operating coil 97a for this period, pulse M passes through closed contact 140d of subtract pilot relay 140, starting just after binary –4– time, and passes along conductor 210, then along conductor 211 to energize subtract relay 136 closing relay contacts 136b, 136d and 136f with a simultaneous opening of related contacts 136a, 136c and 136e. Then said pulse M passes along conductor 212 to conductor 137 and then to ground. Pulse M holds said relay 136 energized throughout the time for receipt of electrical pulses for advancing units readout drum 5 and the tens and hundreds readout drums (not shown), and connects operating coils 98a, 213a and 214a into the input circuits 118, 119 and 120 to operate electro-magnets 63, 197 and 202, respectively, in conjunction with respective subtraction bias coils 97b, 186b and 201b.

Pulse M also passes from the said closed contact 140d along conductor 210 through the said subtraction bias coils 97b, 186b and 201b, and then along conductor 137 to ground, to supply energizing voltage to said bias coils during this part of the cycle as shown.

During the part of the cycle when electrical pulse M is providing subtraction bias and connecting operate coil 98a in the units input circuit 118, as mentioned above interposers 59 and 60 (Fig. 5) normally do not hold drive levers 39 and 48 inoperative but rather said levers are in operative contact with their respective programming cams 18 and 27 (see Fig. 3) and their respective cam followers 92 and 106 move into and out of the low points on said cams, correspondingly advancing readout drum 5.

When an electrical pulse is delivered along conductor 135 during this period of time, it passes through closed contact 136b of subtract relay 136, energizes operating coil 98a and then passes along conductor 137 to ground, thereby causing a particular of interposers 59 and 60 to engage its related cam follower so that a particular of said cam followers will not be actuated by its related programming cam and will therefore not cause the advance program drum 5 as a result of the said pulse.

Following through the subtraction of 006 from the 009 standing in the counter group or as explained above the addition of the nines complement of the minus 006, namely 993, to the counter group, first consider the units counter operation, assuming the subtract pulse has energized subtract pilot relay 140 as above described.

Since a minus six will be represented on the record card by a binary –4– and a binary –2–, at binary –8– time no pulse is received from the card, and with normal bias on the electro-magnet 63, i. e. with bias coil 98b energized, the "8" trip switch lever 36 (Fig. 7) is not released to store an –8–. A binary –4– time a –4– pulse is received from the card, and the "4" trip switch lever 53 (Fig. 2) is released by interposer 60 to respond to its programming cam 32, closing the "4" trip switch 139 (Fig. 13) and storing a –4–. Then the bias shifts to subtraction bias coil 97b from coil 98b due to the cessation of pulse O and the appearance of pulse M in the bias circuits as previously explained, and the end portion 103 of armature 61 is pulled upward as viewed in Fig. 2 causing the interposers to release their respective levers.

At binary –2– time pulse C is delivered from the card to the units counter input circuit 118 and the said pulse passes along conductor 115, through entrance terminal 128, along conductor 134, through closed contact 127a of enter relay 127, along conductor 135, through closed contact 136b of energized subtract relay 136, energizing operating coil 98a and then passing along conductor 137 to ground. The energizing of coil 98a at this time pulls end portion 103 of armature 61 down toward core 100 as viewed in Fig. 2 and causes interposer 59 to engage cam follower member 92 of drive lever 39 so that the said follower member 92 cannot be actuated by the low point a in programming cam 18 (see also Fig. 16). Thus the readout drum 5 is not advanced two decimal units at this time in response to the said low point a.

At binary –1– time no pulse is received from the card to energize operating coil 98a, and so drive lever 48 is free to be actuated by recess a in programming cam 27 and, therefore, readout drum 5 is advanced one decimal unit (see Figs. 2 and 16). Since this advancement of units readout drum 5 moves the said drum from a position of nine to zero, the units carry trip mechanism (Fig. 6) is operated to store the carry in the manner previously described.

Next externally generated electrical pulse J is delivered along conductor 146 at the time shown (Fig. 13) and it passes through the previously closed "4" trip switch 139 in units circuit 118, along conductor 147, through the closed contact 85a of 9's switch 85, along conductor 149, through closed contact 136b of subtract relay 136, through operating coil 98a and along conductor 137 to ground. As a consequence drive lever 39 is not able to be actuated by lowpoint c in programming cam 18 (see Fig. 16) and readout drum 5 is not advanced two decimal units.

Electrical pulse H cannot get through the open "8" trip switch 138 at the time the latter pulse appears along conductor 144, and so drive lever 48 is actuated by lowpoint c in its programming cam 27 and units readout drum 5 is consequently advanced two decimal units.

Electrical pulse K at its time of appearance passes along the same path as the above J pulse and in a similar fashion prevents drive lever 39 from responding to lowpoint e in programming cam 18, thus preventing any advancement of the readout drum 5.

After the receipt of pulse K, the normal addition bias and operating coils must be connected back into the input circuits for carry time, however, so that the carry pulse L can receive proper response by the carry mechanisms. Therefore, a short while before carry time, pulse M ceases, de-energizing subtract relay 136, thereby switching back to operating coils 97a, 186a and 201a, and de-energizing subtraction bias coils 97b, 186b and 201b. Pulse P appears at this time and is delivered along the same path which pulse O followed above, supplying energizing voltage to normal bias coils 98b, 213b and 214b which returns the end portion 103 of armature 61 back against core 100 of electro-magnet 63 (see Fig. 2) in the units counter and similarly positions the armatures (not shown) of the electro-magnets in the other counters.

At carry time, therefore, the carry mechanism (see Fig. 6) is able to operate in a normal fashion as above described to transmit any carries that might have arisen during this cycle.

During the time for above entry of a six into the units counter circuit 118, a nine was delivered in its binary components –8– and –1– to the tens circuit 119 and similarly to the hundreds circuit 120 to represent the complete addition of 993 to the counter group. Since the counter group represented the number 009 after completion of the previous cycle above, the respective readout drums of the counter group are now standing at 992 at this part of the present cycle, with contact 195b of the tens counter 9's switch 195 and contact 196b of the hundreds counter 9's switch 196 closed.

The units carry switch 181 having been closed during the advance of units readout drum 5 in response to binary pulse –2–, and the tens and hundreds 9's switches 195 and 196 being closed at this time as above mentioned, at carry time for the present cycle carry pulse L is delivered along conductor 182 and passes through the identical electrical circuits as it did during the previously described addition cycle, resulting in the advance of the tens and hundreds counter readout drums one decimal unit each (from –9– to –0–) and the "end-around" carry causing the units readout drum 5 to be advanced from –2– to –3–, leaving the counter group standing at 003 with the subtraction accomplished.

READING OUT THE COUNTER GROUP

By referring to the profiles for programming cams 18 and 24 in Fig. 16 it is noted that from binary –8– time through binary –1– time, i. e. during the first part of any given cycle when pulses are being received from a record card, the readout drum 5 (Fig. 2) is stationary, since cam 18 presents the emergent side of its first lowpoint a just after binary –1– time and cam 27 presents the descending part of its first lowpoint a at the same time. This stationary condition of the readout drum 5 permits delivering pulses to the counter input circuits 118, 119 and 120 from the next card while the result of the previous entry is being determined or read out.

During this time nine sensing fingers 68–76 (see Fig. 3) being disposed along the length of readout drum 5 are each actuated by their respective programming cams 20—26, 28 and 30 to probe the surface 66 of readout drum 5 for holes 65 which are arranged on the said surface 66 to represent the binary components of the decimal number corresponding to the number of units the said drum 5 has been advanced. There are also separate holes to represent a plus zero, minus zero and a nine as will be explained.

If one of the above said sensing fingers locates a hole 65 in drum 5 at its particular time of cam actuation as shown in Fig. 16, the movement of the particular finger into its related hole effects the closure of its related electrical switch in the electrical readout circuit (see also Fig. 14), setting up an electrical circuit over which appropriate of the externally generated electrical readout pulses Q, R, S, T, U (Fig. 16) may be delivered to the exit terminals 215, 216 and 217 of the respective units, tens and hundreds readout circuits 218, 219 and 220 shown in Fig. 14. Readout switch operation profiles are shown to the right of the related switches in Fig. 14, the dotted lines representing the particular switch position when the particular hole 65 in readout drum 5 is not adjacent its related one of said sensing fingers.

Fig. 10 shows an enlarged view of the binary –2– sensing mechanism. A cam follower lever 45 is rotatably mounted on pivot 90 and is urged about said pivot 90 in a counterclockwise direction as viewed in Fig. 10 by spring 217. Said lever 45 has a cam follower member 226 which is movable by the urging of said spring 217 into engagement with the continuously rotating program cam 24 mounted on shaft 14. Said cam 24 has a high point $a$, a low point $b$ and an intermediate level $c$ (see also profile V in Fig. 14) which are presentable to said cam follower member 226 during different periods during each cycle of rotation of said cam.

Said lever 45 also has an electrical switch actuating member 227 which engages movable electrical contact 228 of binary –2– readout switch 83. A sensing finger 72 on said lever 45 is located adjacent readout drum 5 and is movable into and out of holes 65 in the surface 66 of said drum 5 when said holes 65 are properly positioned relative to said finger 72 by the advance of readout drum 5. The particular holes 65 associated with sensing finger 72 are shown along the binary –2– line of the diagram in Fig. 4.

Assuming a hole 65 in the readout drum 5 is positioned so that sensing finger 72 can be moved into said hole 65, when said lowpoint $b$ in cam 24 is presented to cam follower member 226 at binary –2– time, the urging of spring 217 causes said member 226 into lowpoint $b$, the rotation of lever 45 about pivot 90, the movement of finger 72 into hole 65 of drum 5, and the movement of movable contact 228 against stationary contact 83$b$ of readout switch 83 of the units counter (see also Fig. 14), providing an electrical circuit for conducting externally generated binary –2– readout pulse S from input conductor 230 to exit terminal 215 as will be subsequently outlined in greater detail. At this same time similar binary –2– readout mechanisms are being actuated in the tens and hundreds units circuits 219 and 220. In the event that no hole 65 in drum 5 was properly positioned to receive sensing finger 72 at binary –2– time, due to the fact that the present decimal number represented by the position of readout drum 5 has no binary –2– component (e. g., a decimal –1–), then the said finger 72 would contact surface 66 of drum 5 and the rotation of lever 45 about pivot 90 would be limited so that movable contact 228 would not be moved against said contact 83$b$ and switch 83 would remain in a mid-position as indicated by the dotted line in profile V of Fig. 14. Thus, the binary –2– readout pulse S would not get through to exit terminal 215.

During binary –8– and binary –4– times movable contact 228 is positioned against stationary contact 83$a$ of the said readout switch 83 by the appropriate actuation of lever 45 by highpoint $a$ on cam 24, thus providing part of the electrical circuitry required to conduct binary –8– pulse Q or binary –4– pulse R to exit terminal 215. As is apparent, such latter positioning of movable contact 228 occurs every cycle irrespective of the position of readout drum 5.

During the greater portion of the cycle, as can be seen in profile V of Fig. 14, cam follower member 226 rides on mid level $c$ of cam 24 and consequently movable contact 228 is held in a non-conducting mid-position away from both contacts 83$a$ and 83$b$.

All of the sensing fingers 68–76 inclusive are operated in a similar manner but at different times as shown by their related switch and cam profiles in Fig. 14 and Fig. 16 respectively.

The necessity for nine sensing fingers in this particular invention may be explained by reference to the following chart and also Fig. 4, zeros in the chart indicating negative number or nines complement components and X's therein representing positive or true number components, both zeros and X's indicating holes in the readout drum of any particular counter. The negative and positive decimal numbers are arranged along the opposite sides of the following chart in their nines complementary relationship to one another.

*Binary components*

| (True) Positive Numbers | 8 | 4 | 2 | 1 | Negative Numbers |
|---|---|---|---|---|---|
| 0 | 0 | ---- | ---- | 0 | 9 |
| 1 | 0 | ---- | ---- | X | 8 |
| 2 | ---- | 0 | 0-X | 0 | 7 |
| 3 | ---- | 0 | 0-X | X | 6 |
| 4 | ---- | 0-X | ---- | 0 | 5 |
| 5 | ---- | 0-X | ---- | X | 4 |
| 6 | ---- | X | 0-X | 0 | 3 |
| 7 | ---- | X | 0-X | X | 2 |
| 8 | X | ---- | ---- | 0 | 1 |
| 9 | X | ---- | ---- | X | 0 |

For any particular position of the readout drum it is sometimes necessary to read out the true number, e. g. after an addition cycle, or the nines complement of such true number, e. g. after a subtraction cycle when the difference is a negative number.

For example, if after a subtraction cycle the difference is a negative number represented by a three-counter group as 996, it is desirable to read such negative number out as a minus 003. The units counter stands at a true number six position, but instead of reading out a binary –4– and a binary –2– as during addition, a binary –2– and a binary –1– must be read out. Therefore at a true number six position of the readout drum at least three holes must be provided: a binary –4– hole, a binary –2– hole and a binary –1– hole.

By observing on the above chart the binary component holes which must be located on the readout drum at each true number position of the said drum to indicate both the true and negative numbers, the following facts become apparent.

It can be seen that the binary –2– component is utilized at the same position of the readout drum for either a positive or negative number designation, that is to say the X's and zeros all occur at the same binary –2– positions, and so only one set of holes and a related sensing mechanism need be employed for the binary –2– readout. The binary –8– components are required at different positions of the readout drum for a positive and a negative number designation, and the binary –4– components are required partly at different positions and partly at the same positions, so that there must be separate sensing mechanisms for all of the latter positive and negative components, the negative mechanisms being designated in Fig. 4 by a prime indicator (i.e. 8' and 4'). Since the binary –1– component is utilized in a consistently alternating pattern only one binary –1– sensing mechanism is needed. A hole in the readout drum indicates a binary –1– for a positive or true number and the absence of a hole indicates a binary –1– for a negative number.

A "nine" sensing mechanism is utilized in two different manners in this device. In the input circuits as shown in Fig. 13, when, for example, the readout drum of the tens counter stands at a position representing a decimal nine, and the units carry switch 181 is closed to transfer a carry from the units circuit 118 to the tens circuit 119, then at carry time an electrical circuit must be provided to transmit carry pulse L received by the tens circuit 119 from the units circuit 118, to the hundreds circuit 120 as previously mentioned above for the carry operation during the addition cycle example.

The setting of the highest order counter in a counter group at a position of nine can be utilized to indicate the presence of a negative number in the said counter group and consequently it is necessary to provide a separate electrical switch for use in the readout circuit (see Fig. 14) which will be operated at the same time as the above 9's switches 85, 195 and 196 in the input circuits (Fig. 13). Therefore, in each counter there is one nines sensing finger 74 (Fig. 3) which simultaneously operates the above two separate electrical switches. The nines sensing finger 74 is not used to read out a nine from the counter.

To provide an electrical output pulse from, for example, the units counter to indicate a zero position of the readout drum 5, it is apparent from a comparison of the time required for delivery of the readout pulses Q, R, S, T, and U with the stationary period of the readout drum 5 until it can be first advanced due to pulses C or F in response to electrical pulses received from the next card, that the said drum can possibly be moved before the time of zero readout pulse U (see Fig. 16). Thus, a +0 sensing finger 75 and a —0 sensing finger 76 (Fig. 3) are provided for probing the readout drum 5 during binary –8– time and storing the location of a +0 or —0 hole in said drum by closing electrical readout switch 86 or 87 respectively (Fig. 14). Then at zero readout time the readout circuits can operate properly even if the readout drum is in motion.

At binary –8– time if a +0 stands in the readout drum 5 of the units counter the +0 sensing mechanism operates as follows (see Fig. 9). A lever 49, rotatable about the pivot 90, has a sensing finger 75 which is movable into a hole 65 in readout drum 5 if such hole is positioned adjacent said finger 75 by the previous advance of the readout drum 5 for a +0 indication. Such movement of the sensing finger 75 is caused by a cam follower member 237 on said lever 49 being urged by the pressure of spring 238 to move into a lowpoint a in programming cam 28 on the continuously rotating shaft 14 at binary –8– time, thereby rotating said lever 49 counterclockwise as viewed in Fig. 9 (see also Fig. 16).

Two-armed lever 239 is rotatably mounted on shaft 4 and has one arm 240 which slidably bears against an edge portion 241 of lever 49 so that the above counterclockwise motion of lever 49 causes the said two-armed lever 239 to rotate clockwise. Such rotation of lever 239 causes its other arm 242 to be moved out of latched engagement with one arm 243 of a three-armed lever 50 causing the latter lever 50 to be rotated clockwise by the tension in spring 244 which interconnects levers 239 and 50. This clockwise rotation of three-armed lever 50 causes switch closing member 245 on a second arm 246 of lever 50 to move a movable electrical contact 247 against stationary contact 86a and effect the closure of the +0 readout switch 86, and also causes end portion 248 or resetting arm 249 of said lever 50 to move into operative contact with resetting programming cam 29.

Switch 86 will remain in this closed position until just after zero readout time (see also Fig. 16) and then be restored to its normally open position by end portion 248 of resetting arm 249 which rides up on highpoint b on resetting programming cam 29 causing the three-armed lever 50 to rotate counterclockwise about pivot 90 as viewed in Fig. 9. Arm 243 of said three-armed lever 50 is, consequently, moved back into a latched position with arm 242 of two-armed lever 239 and switch closing member 245 moves the movable contact 247 away from stationary contact 86a, opening said readout switch 86. This latched position is maintained until the further actuation of said +0 sensing mechanism during a subsequent cycle. The operation of said switch 86 is also shown in profile IX in Fig. 14.

It is important to note that if the sensing finger 75 of lever 49 finds no hole 65 in readout drum 5 into which it can move at binary –8– time, then cam follower member 237 of said lever cannot move into lowpoint a on its programming cam 28, and so the two-armed and three-armed levers 239 and 50 respectively remain in a latched position with the result that said readout switch 86 remains open for this cycle, as indicated by the dotted line in profile IX of Fig. 14.

Sensing finger 76 (Fig. 3) of the —0 sensing mechanism in the units counter operates in a similar fashion under control of cam 30 and resetting cam 31 both on shaft 14 to actuate the negative zero readout switch 87 shown in Fig. 14.

Figure 4:
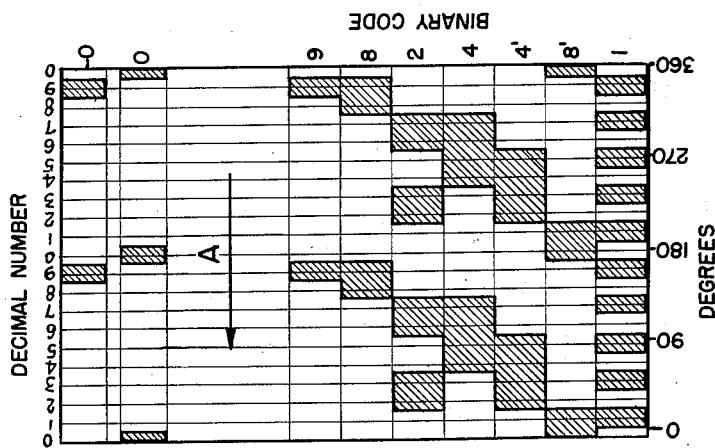
Fig. 4 is a projection of the surface of the Readout Drum and the zero and negative zero readout surfaces.

As mentioned above the surface of the units circuit readout drum 5 is shown in Fig. 4, the shaded areas representing holes 65 in the surface 66 into which the nine corresponding sensing fingers 68–76 above described may enter so as to actuate the electrical readout switches 79–87 shown in the units readout circuit 218 of Fig. 14. If, for instance, the units circuit readout drum 5 is at a position representing a decimal –7– during the reading out operation the binary –4–, –2– and –1– sensing fingers 71, 72 and 68 respectively (Fig. 3) will at their proper times enter the properly positioned –4–, –2– and –1– holes 65 in said drum 5, closing readout switches 82, 83 and 79 respectively as shown in related profiles III, V and VI in Fig. 14, and permitting the externally generated binary readout pulses R, S and T to be transmitted at those respective times from input conductor 230 through to exit terminal 215.

Thus, assuming that a positive 007 is to be read out of the counter group electrical readout or output circuit shown in Fig. 14 and that an external electrical pulse (not shown) has been fed into readout terminal 253 to energize pickup coil P of an externally located readout relay 254, which closes relay contacts 254a–d. Closing these said contacts connects positive busses 255, 256 and 257 of the units, tens and hundreds output circuits 218, 219 and 220 respectively through the normally closed related contacts 258a, c and e of an externally located de-energized invert relay 258 and through the said closed contacts 254a, b and c of energized readout relay 254 to exit terminals 215, 216 and 217 respectively. An externally generated holding voltage pulse W is fed along conductor 259, through closed contact 254d, energizing holding coil H of readout relay 254 and then passing to ground. Pulse W keeps the said relay contacts 254a–d closed from binary –8– time until just after binary –0– time.

Considering the units counter circuit 218 first, at binary –8– time pulse Q is delivered from ocnductor 230 to conductors 260 and 261, along conductor 260 to conductor 262, through closed contact 83a of the –2– readout switch 83 and along conductor 264, but since switches 80, 81, 82 and 84 are open, the said pulse Q cannot go any further. At binary –4– time pulse R is delivered along conductor 230, along conductor 260 then along conductor 262, through closed contact 83a of –2– readout switch 83, along conductor 264 and through closed contact 82b of the –4– readout switch 82, along ocnductor 265, along positive bus 255, through closed contact 258a of invert relay 258, then along conductor 266 and through closed contact 254a of readout relay 254 to units circuit exit terminal 215.

At binary –2– time pulse S proceeds along conductors 230, 260 and 261 in that order, through closed contact 84a of –8– readout switch 84, along conductor 264, through closed contact 83b of –2– readout switch 83 and along conductors 267 and 266 through closed contact 254a to exit terminal 215.

At binary –1– time pulse T travels along conductors 230, 260 and 261, through closed contact 84a of –8– readout switch 84, along conductor 264 and through closed contact 81a of –4'– and readout switch 81, along conductor 271 and through closed contact 79b of –1– readout switch 79 and down the positive bus 255, through closed contact 258a of deenergized invert relay 258, along conductor 266, and through closed contact 254a of readout relay 254 to exit terminal 215.

At −0− time the zero readout pulse U cannot get through to exit hub 215.

The said pulse U passes along conductor 230, 260 and 261, through the closed contact 84a of the −8− readout switch 84, along conductor 264, through closed contact 80a of the −8− readout switch 80, along conductor 268, through closed contact 269b of a program switch 269, but since +0 and −0 readout switches 86 and 87 respectively are open the said pulse U can go no further.

In the above manner a seven in the units digit circuit 218 has been electrically transmitted to exit hub 215 in its binary components. In the tens and hundreds circuits 219 and 220, the electrical pulses Q, R, S and T do not get through to the respective exit terminals 216 and 217, because at their respective time pulses Q, R, S and T are stopped in the tens circuit 219 at open switches 273, 273, 272 and open contact 258d of de-energized invert relay 258 respectively, and in the hundreds circuit 220 at open switches 274, 274, 275 and open contact 258f of the said de-energized invert relay 258 respectively.

In both latter circuits the zero readout pulse U does get through in the following manner. In the tens circuit 219 at −0− time, therefore, pulse U passes along conductors 230 and 276, through the closed contact 273a of −8− readout switch 273, along conductor 277, through closed contact 278a of −8′− readout switch 278, along conductor 279, through closed contact 280b of program switch 280, along conductor 281, through closed contact 282a of positive zero readout switch 282 and along positive bus 256, through closed relay contacts 258c and 254b to tens circuit exit terminal 216. The zero readout pulse U follows a similar path through the hundreds circuit 220 and likewise is delivered to the hundreds exit hub 217 at −0− time.

Thus the positive decimal number 007 is delivered to exit terminals 215, 216 and 217 in the form of binary code electrical pulses. These pulses may be fed to the input of another similar counter group, to a recording or printing device or utilized in some other appropriate fashion.

Program switches 269, 280 and 283 of the respective units, tens and hundreds circuits 218, 219 and 220 are all identical. The units program switch 269 is shown in Fig. 11 with its associated programming cam 19 and pivoted lever 40. Spring 284 urges cam follower member 285 of said lever 40 against said cam 19 and as said follower member 285 responds to highpoint a on said cam 19, lever 40 rotates clockwise about pivot 90 and switch closing member 286 on said lever 40 moves a movable contact 287 against stationary contact 269a of electrical program switch 269, thus providing an electrical pulse conduction path in the units readout circuit 218 shown in Fig. 14. Lowpoint b on cam 19 causes movement of said movable contact 287 against stationary contact 269b of said switch 269. When cam follower member 285 rides on mid-level c on said cam 19, program switch 269 is in the middle or non-conducting position as shown in Fig. 11. The profile of cam 19 is shown in Figs. 14 and 16.

After the decimal number represented by the position of the readout drums of the counter group has been read out, that is to say, transmitted to the exit terminals 215, 216 and 217 of the counter readout or output circuits 218, 219 and 220 in the above described manner, the readout drums are advanced to positions for representing the accumulation of the next number. After the new number has been thus entered, the readout drum of the highest order counter (i. e. the hundreds counter) is tested for the presence of a nine by the hundreds circuit 9's sensing finger (not shown) which is similar in operation to the units circuit 9's sensing finger 74 (Fig. 3) previously described.

As pointed out above the presence of a nine in such highest order counter indicates that a negative number stands in the counter group and is about to be read out during the next cycle of operation, and it is desirable to have some indication ahead of time to that effect so that the invert relay 258 can be energized so that the true form of the negative number will be read out from the negative busses 288, 289 and 290 of the units, tens and hundreds counter circuits 218, 219 and 220 rather than the nines complement of such number which will be delivered to the positive busses 255, 256 and 257 during the same period of time.

Negative number indication is effectuated as follows: At control time the externally generated control pulse V passes along conductor 230 to the hundreds circuit 220, down conductor 289 and through closed contact 283a of program switch 283, along conductor 292 and through closed contact 196c of 9's switch 196. The 9's switch 196 was closed at this time because a nine is standing in the readout drum of the hundreds counter circuit 220 and thus the nine sensing finger of the hundreds counter found a hole in the readout drum closing electrical contact 196c. From the 9's switch the control pulse V travels along negative bus 290, through closed contact 293a of the −1− readout switch 293, along conductor 294, through closed contact 295a of the −4′− readout switch 295, along conductor 296, through closed contact 297a of −4− readout switch 297 and along conductor 298 to negative balance exit terminal 299. The pulse from this latter terminal can be used to control other mechanisms associated with negative balance or negative number indication, such as to cause the actuation of a mechanism to make some printed indication alongside the number to be read out of the counter group during the immediately succeeding cycle that such number is negative.

The control pulse V also simultaneously proceeds from the hundreds circuit −4− readout switch 297 along conductor 300 to energize pickup coil P of invert relay 258 and close contacts 258b, d, f and g so that negative busses 288, 289 and 290 will be connected to their respective exit terminals 215, 216 and 217 for the reading out operation during the next cycle, and thus the true form of the negative number standing in the counter group will be transmitted in the form of electrical pulses to the said exit terminals.

READING OUT NEGATIVE NUMBERS

It will be remembered that if a minus 003 is read from the record card, then the nines complement of that number, or 996, will be delivered or read into the counter group.

In the units counter circuit 118 (see Fig. 3) the readout drum 5 will be advanced seven decimal units, six of those units representing advancements as a result of no electrical pulses being received to energize the operating coil 98a of electromagnet 63 (see also Fig. 13) and cause it to position armature 61 so that its interposers 59 and 60 would prevent response of drive levers 39 and 48 to their programming cams 18 and 27, respectively. The above seventh decimal unit of advance is due to the "end around" carry as explained above. The units counter readout drum 5 stands at a position of −6− which would be read out as a −6− from the positive bus 255 (Fig. 14) or as a −3− from the negative bus 288. Since the latter is desired the negative bus 288 is connected via invert relay contact 258b into the exit terminal 215 to read out this negative number properly.

In reading out this negative number −6− as a −3−, assume that during control time the invert relay 258 was energized by control pulse V in the manner described. During the next cycle, therefore, at binary −8− time and at binary −4− time the electrical readout pulses Q and R, respectively, cannot get through to the units exit hub 215 because the proper switches are not closed. At binary −2− time pulse S is delivered from conductor 230, along conductors 260 and 261, through the closed contact 84a of the −8− readout switch 84, along conductor 264 and through closed contact 83b of the −2− readout switch 83, and along conductors 267 and 266, through closed contact 254a of readout relay 254 to exit terminal 215.

At binary −1− time the pulse T goes along conductor 230, through closed contact 84a of −8− readout switch 84, along conductor 264, through closed contact 81a of −4′− readout switch 81, along conductor 271, through closed contact 79b of −1− readout switch 79 to negative bus 288, through closed contact 258b of energized invert relay 258, along conductor 266 and through closed contact 254a to exit terminal 215.

Consider a second example of reading out a minus −8− in the units counter circuit 218. The invert relay 258 once again is energized by the control pulse V as in the previous example. At binary −8− time the electrical pulse Q passes along conductor 230, along conductors 260 and 262 and through closed contact 83a of −2− readout switch 83, then along conductor 264 and through the closed contact 80b of −8′− readout switch 80, and along the negative bus 288, although closed contact 258b, conductor 266 and closed contact 254a to the exit terminal 215. At this point, the reading-out operation should be apparent.

By the proper delivery of external electrical pulses to input terminal 253 of readout relay 254, either sub-totals can be read out of the counter group or merely final totals if they only are desired.

RESETTING THE COUNTER

This particular counter is reset to nine rather than zero at the completion of one series of operations and before beginning another series. Referring to Fig. 15, the units counter input circuit 118 and readout circuit 218 are shown connected for automatic resetting. The resetting of an entire counter group will be handled in the same way.

Since the negative bus 288 in the readout circuit 218 delivers electrical readout pulses which represent the nines complement of the true number represented by the position of readout drum 5, it is only necessary to connect the said negative bus 288 to the counter input circuit 118, and that will cause the readout drum 5 to be advanced to a setting of nine.

Therefore, negative bus 288 is made connectable by conductor 301, contact 302a of reset relay 302, conductor 303 and contact 127e of enter relay 127 to the units counter input circuit 118. When it is desired to reset to nine, a separate cycle is necessary. An external electrical pulse (not shown) is delivered to reset input terminal 304 to energize pickup coil P of reset relay 302, which thereby closes contact 302a aforementioned and also closes contact 302b to deliver holding voltage pulse E from conductor 131 to holding coil H of the said reset relay 302. Enter relay 127 will receive no external energizing pulse during this resetting cycle so contact 127e will remain in its normally closed position completing the required conduction path for the resetting operation.

The addition of a number and its nines complement will not produce a carry which thus makes the resetting of a counter a function only of that counter position and the carry circuits are not concerned.

ZERO BALANCE TEST

Another feature of this invention is the provision for an automatic check once during each cycle for a setting of all of the readout drums of the counter group to positions representing nines which are initial "zero" or starting positions of the said drums at the start of a particular series of accumulating operations. This check is made by the control pulse V and is used to make certain that an automatic resetting operation has been properly carried out.

Thus, at control time during a resetting cycle when all counters will be set at nines, control pulse V passes along conductor 230 in Fig. 14 to the hundreds counter circuit 220, then along conductor 291, through closed contact 283a of program switch 283, along conductor 292 and through closed contact 196c of 9's switch 196, along conductor 308 to the tens counter circuit 219 where it passes through closed contact 280a of program switch 280, along conductor 309, and through closed contact 195c of 9's switch 195, and along conductor 310 to the units circuit program switch 269. The said control pulse V passes through closed contact 269a of said program switch 269, along conductor 311 and through closed contact 85c of 9's switch 85, then along negative bus 288, through closed contact 79a of −1− readout switch 79, along conductor 271 and through closed contact 81a of −4′− readout switch 81, along conductor 264, through closed contact 82a of −4− readout switch 82, and finally along conductor 312 to the zero balance exit terminal 313. From the said terminal 313 the said pulse V may be utilized with other apparatus associated with the counter group to indicate that the said group has been properly reset.

This counter mechanism is designed so that each unit is easily replaceable in a counter group circuit. Fig. 8 shows a group of three counters 314 disposed along the continuously rotating drive shaft 58 so that they may be synchronously driven by gears 57 which are affixed to the said shaft 58. Terminals 315 connected to the stationary and movable contacts of the various electrical switches in the counter input circuits (Fig. 13) and readout circuits (Fig. 14) extend outwardly from the rear panels 316 of said counters 314 and enable each counter 314 to be easily plugged into or disconnected from a counter group electrical circuit such as is shown in Fig. 13. Thus, the present type counter is readily adapted for easy mechanical and electrical inter-connection with other counters of the same type and being of compact size, it permits an efficient utilization of space.

While there have been shown and described the fundamental novel features of the invention as applied to a particular embodiment, it will be understood that various changes in the form and details of the device can be made by those skilled in the art without departing from the spirit of the invention. It is the intention, therefore, to be limited only as indicated by the scope of the following claims.

What is claimed is:

1. A code counter comprising a counting means for progressively accumulating single digit numbers, electrical input means for receiving modified binary coded electrical pulses representing said numbers to be accumulated by said counting means, advancing means for advancing said counting means in response to said pulses received by said input means, sensing means for determining the position to which said counting means has been advanced by said advancing means in response to one group of said pulses, means for actuating said sensing means to cause the latter to determine said position at the same time a succeeding group of electrical pulses is being received by the same said input means representing the next number to be accumulated by said counting means, and an electrical output means for delivering coded electrical pulses representing the position of said counting means as determined by said sensing means.

2. A code counter comprising a counting means for progressively accumulating single digit numbers, electrical input means for receiving modified binary coded electrical pulses representing said numbers to be accumulated by said counting means, advancing means for advancing said counting means in response to said pulses received by said input means, sensing means for determining the position to which said counting means has been advanced by said advancing means in response to one group of said pulses, means for actuating said sensing means to cause the latter to determine said position at the same time a succeeding group of electrical pulses is being received by the same said input means representing the next number to be accumulated by said counting means, an electrical output means for delivering coded electrical pulses representing the position of said counting means as determined by said sensing means, and means for determining the presence of negative numbers in said counter.

3. A code counter comprising a counting means for progressively accumulating single digit numbers, electrical input means for receiving coded electrical pulses representing said numbers to be accumulated by said counting means, advancing means for advancing said counting means in response to said pulses received by said input means, sensing means for determining the position to which said counting means has been advanced by said advancing means in response to one group of said pulses, means for actuating said sensing means to cause the latter to determine said position at the same time a succeeding group of electrical pulses is being received by said input means representing the next number to be accumulated by said counting means, an electrical output means for delivering coded electrical pulses representing the position of said counting means as determined by said sensing means, means for storing each carry occurring during the progressive accumulation by said counting means of numbers resulting from pulses received by the input means, and means for effecting delivery of each said carry externally of said counter after said counting means has been advanced in response to particular numbers involved.

4. The code counter of claim 3 in which said means for storing each carry comprises a switch closing means for effecting the closing of an electrical switch to transmit an electrical advance instructing pulse externally of said counter, said switch closing means being movable from a switch open position to a switch closed position, a cam means, a cam follower means for movement into operative contact with said cam means, said switch closing means and said cam follower means being interconnected for cooperative action, latching means to hold said closing means in a switch open position and said cam follower means out of operative contact with said cam means, tripping means for disengaging said latching means upon the advance of said counting means causing a carry, the disengaging of said latching means effecting the movement of said cam follower means into operative contact with said cam means, said cam means actuating said cam follower means to cause said switch closing means to move to a switch closed position, said cam means also actuating said cam follower means to cause said closing means to move from a switch closed position to a switch open position and to re-engage said latching means.

5. The code counter of claim 3 in which said means for storing each carry comprises a pivotally mounted lever, a continuously rotating cam surface, a cam follower means on said lever movable into operative engagement with said cam surface, a pivoted latch member normally maintaining said lever in a locked position in which said cam follower means is out of operative engagement with said cam surface, a second cam surface rotatable in step with said counting means, cam lugs on said second cam surface between positions of said counting means representing the numbers nine and zero, a pivotally mounted trip lever controllably engaging said latch member, a cam follower means on said trip lever in responsive contact with said second cam surface, said latch member being movable by said trip lever to a release position with respect to said pivotally mounted lever when said trip lever is actuated by the movement of said latter cam follower means in response to one of said cam lugs as said counting means is advanced from a position representing nine to a position representing zero, requiring the transfer of a carry, the first named said cam follower means operatively engaging the first named of said cam surfaces when said pivotally mounted lever and said latch member are in released position relative to one another, an electrical switch closing member on said latter lever movable into a switch closing position by the operative action of said latter cam surface and said latter cam follower means, said switch closing position permitting the delivery of an electrical advance instructing pulse to the locking means of another counter circuit to advance the counting means of said latter counter circuit one unit in response to said pulse, said pivotally mounted lever and said latch member being reset to a locked position by the response of said latter cam follower means to a resetting position of said latter cam surface.

6. A code counter comprising a counting means for progressively accumulating single digit numbers, electrical input means for receiving modified binary coded electrical pulses representing said numbers to be accumulated by said counting means, advancing means for advancing said counting means in response to said pulses received by said input means, storage means in said input to delay the actuation of said advancing means in response to said pulses until one group of said pulses has been received by said input means, thereby permitting said counting means to remain stationary during the receipt of said group of pulses, sensing means for determining the position to which said counting means has been advanced by said advancing means in response to one group of said pulses, means for actuating said sensing means to cause the latter to determine said position at the same time a succeeding group of electrical pulses is being received by the same said input means representing the next number to be accumulated by said counting means, and an electrical output means for delivering coded electrical pulses representing the position of said counting means as determined by said sensing means.

7. A code counter comprising a counting means for progressively accumulating single digit numbers, electrical input means for receiving coded electrical pulses representing said numbers to be accumulated by said counting means, advancing means for advancing said counting means in response to said pulses received by said input means, said advancing means comprising a pair of pivoted levers, a gear sector on each lever, gears mounted for one way rotation of said counting means and each meshing respectively with one of the said gear sectors, continuously rotating cams, cam follower means on each lever operatively engaging respective of said cams, said cams being positioned to operate said levers in alternation and to advance said counting means stepwise, storage means in said input to delay the actuation of said advancing means in response to said pulses until one group of said pulses has been received by said input means, thereby permitting said counting means to remain stationary during the receipt of said entire binary group, sensing means for determining the position to which said counting means has been advanced by said advancing means in response to one group of said pulses, said position being determined by said sensing means at the same time a succeeding group of electrical pulses is being received by said input means representing the next number to be accumulated by said counting means, and an electrical output means for delivering coded electrical pulses representing the position of said counting means as determined by said sensing means.

8. A code counter comprising a counting means for progressively accumulating single digit numbers, electrical input means for receiving coded electrical pulses representing said numbers to be accumulated by said counting means, advancing means for advancing said counting means in response to said pulses received by said input means, said advancing means comprising a pair of pivoted levers, a gear sector on each lever, gears mounted for one way rotation of said counting means and each meshing respectively with one of the said gear sectors, continuously rotating cams, cam follower means on each lever operatively engaging respective of said cams, said cams being positioned to operate said levers in alternation and to advance said counting means stepwise, storage means in said input to delay the actuation of said advancing means in response to said pulses until one entire group of said pulses has been received by said input means, thereby permitting said counting means to remain stationary during the receipt of said entire group of said pulses, and electrically controllable locking means for maintaining each of said cam follower means out of operative contact with its respective of said cams unless an advance instructing electrical pulse is delivered to said locking means to cause the release of a particular of said levers at a time in the rotation of the respective of said cams when the cam follower means on the particular lever may operatively engage the respective of said cams and cause the respective lever to advance said counting means stepwise a predetermined amount, sensing means for determining the position to which said counting means has been advanced by said advancing means in response to one group of said pulses, said position being determined by said sensing means at the same time a succeeding group of electrical pulses is being received by said input means representing the next number to be accumulated by said counting means, and an electrical output means for delivering coded electrical pulses representing the position of said counting means as determined by said sensing means.

9. A code counter comprising a counting means for progressively accumulating single digit numbers, electrical input means for receiving coded electrical pulses representing said numbers to be accumulated by said counting means, advancing means for advancing said counting means in response to said pulses received by said input means, said advancing means comprising a pair of pivoted levers, a gear sector on each lever, gears mounted for one way rotation of said counting means and each meshing respectively with one of the said gear sectors, continuously rotating cams, cam follower means on each lever operatively engaging respective of said cams, said cams being positioned to operate said levers in alternation and to advance said counting means stepwise, storage means in said input to delay the actuation of said advancing means in response to said pulses until one entire group of said pulses has been received by said input means, thereby permitting said counting means to remain stationary during the receipt of said entire group of said pulses, and locking means controllable by selectively energizable operating means, one of said operating means energizable in response to advance instructing pulses to move said locking means into locking engagement with respect to each of said cam follower means, thereby maintaining said cam follower means out of operative contact relative to its respective of said cams, latter said operating means when in a de-energized condition permitting a particular of said cam follower means to move into operative contact with its respective of said cams at a time in the rotation of the respective of said cams when the latter said cam follower means may operatively engage the respective of said cams and cause the respective lever to advance said counting means stepwise a predetermined amount, a second operating means energizable in response to said pulses to move said locking means out of locking engagement with respect to each of said cam follower means permitting a particular of said cam follower means to move into operative contact with its respective of said cams, said second operating means when de-energized being in locking engagement with respect to each of said cam follower means maintaining said cam follower means out of operative contact with respect to its respective of said cams, means for selecting one of the above said operating means, sensing means for determining the position to which said counting means has been advanced by said advancing means in response to one group of said pulses, said position being determined by said sensing means at the same time a succeeding group of electrical pulses is being received by said input means representing the next number to be accumulated by said counting means, and an electrical output means for delivering coded electrical pulses representing the position of said counting means as determined by said sensing means.

10. The counter of claim 8 in which said storage means comprises a switch closing means for effecting the closing of an electrical switch providing thereby an electrical pulse conduction path for the delivery of electrical advance instructing pulses to said advancing means, said switch closing means being movable from a switch open to a switch closed position, latch means for locking said closing means in said switch open position, tripping means for causing said latch means to release said closing means and to permit the latter means to move into a switch closed position, cam means, cam follower means connected to said tripping means and being movable into operative contact with said cam means to actuate said tripping means in response to said cam means, electrically-controllable locking means to hold said cam follower means in a locked position out of operative contact with said cam means unless an electrical pulse is received to cause said locking means to release said cam follower means, resetting means for resetting said closing means into a switch open position and said latch means into a locking position relative to said closing means, said cam follower means movable by said cam means into a locked position relative to said locking means.

11. The counter of claim 8 in which said storage means comprises a pair of pivotally mounted levers, cam follower means on each of said levers, a separate continuously rotating cam surface for each of said cam follower means against which the related of said follower means is movable, electrically releasable locking means for maintaining each of said cam follower means out of operative contact with the respective cam surface unless said locking means is electrically energized to a release condition at a time when a particular of said cam follower means is permitted to move into operative engagement with its particular adjacent cam surface, a two-armed lever and a three-armed lever, one arm of said two-armed lever being in responsive engagement with said pivotally mounted lever and the other arm of said two-armed lever then being in releasable engagement with one arm of said three-armed lever, the operation of said cam follower means by said cam surface in a portion of the rotation of said surface effecting the movement of said two-armed lever by said pivotally mounted lever into a release position with respect to said three-armed lever, another of the arms of said three-armed lever constituting an electrical switch closing member, said latter member moved from a switch open position into a switch closed position when said two-armed lever and said three-armed lever are in the release position, a third arm of said latter lever constituting a resetting cam follower, and a continuously rotating resetting cam surface with which said resetting cam follower moves into cooperative contact when said three-armed lever is in its release position to reset one arm of said two-armed lever and one arm of said three-armed lever to their original position of engagement, to move said switch closing member from a switch closed position to a switch open position, and to move said resetting cam follower itself back out of cooperative contact with said resetting cam surface.

12. A code counter comprising a counting means for progressively accumulating single digit numbers, electrical input means for receiving modified binary coded electrical pulses representing said numbers to be accumulated by said counting means, mechanical advancing means for advancing said counting means in response to said pulses received by said input means, sensing means for determining the position to which said counting means has been advanced by said advancing means in response to one group of said pulses, means for actuating said sensing means to cause the latter to determine said position at the same time a succeeding group of electrical pulses is being received by the same said input means representing the next number to be accumulated by said counting means, an electrical output means for delivering coded electrical pulses representing the position of said counting means as determined by said sensing means, and means for advancing said counting means by an amount representing the nines complement of a number presented to said input means which is to be subtracted from the number already represented by the position of advance of said counting means.

13. A code counter comprising a counting means for progressively accumulating single digit numbers, electrical input means for receiving modified binary coded electrical pulses representing said numbers to be accumulated by said counting means, mechanical advancing means for advancing said counting means in response to said pulses received by said input means, sensing means for determining the position to which said counting means has been advanced by said advancing means in response to one group of said pulses, means for actuating said sensing means to cause the latter to determine said position at the same time a succeeding group of electrical pulses is being received by the same said input means representing the next number to be accumulated by said counting means, an electrical output means for delivering coded electrical pulses representing the position of said mounting means as determined by said sensing means, and means for performing subtraction operations.

14. A code counter group comprising a plurality of single digit code counters electrically and mechanically interconnected for the simultaneous accumulation of the separate digit components of numbers progressively presented to said counter group, each of said counters comprising a counting means for progressively accumulating a particular digit component of said numbers, an electrical input means for receiving modified binary coded electrical pulses representing said digit component to be accumulated by said particular counting means, mechanical advancing means for advancing said particular counting means in response to said pulses received by its said electrical input means, sensing means for determining the position to which said particular counting means has been advanced by said advancing means in response to one group of said pulses, means for actuating said sensing means to cause the latter to determine said position at the same time a group of electrical pulses is being received by the same said input means representing the next number to be accumulated by said particular counting means, and an electrical output means for simultaneously delivering coded electrical pulses representing the positions of the counting means of all of said counters as determined by their respective sensing means.

15. A code counter group comprising a plurality of single digit code counters electrically and mechanically interconnected for the simultaneous accumulation of the separate digit components of numbers progressively presented to said counter group, each of said counters comprising a counting means for progressively accumulating a particular digit component of said numbers, an electrical input means for receiving modified binary coded electrical pulses representing said digit component to be accumulated by said particular counting means, mechanical advancing means for advancing said particular counting means in response to said pulses received by its said electrical input means, sensing means for determining the position to which said particular counting means has been advanced by said advancing means in response to one group of said pulses, means for actuating said sensing means to cause the latter to determine said position at the same time a group of electrical pulses is being received by the same said input means representing the next number to be accumulated by said particular counting means, an electrical output means for simultaneously delivering coded electrical pulses representing the positions of the counting means of all of said counters as determined by their respective sensing means, and means for determining the presence of negative numbers in said counter group.

16. A code counter group comprising a plurality of single digit code counters electrically and mechanically interconnected for the simultaneous accumulation of the separate digit components of numbers progressively presented to said counter group, each of said counters comprising a counting means for progressively accumulating a particular digit component of said numbers, an electrical input means for receiving coded electrical pulses representing said digit component to be accumulated by said particular counting means, mechanical advancing means for advancing said particular counting means in response to said pulses received by its said electrical input means, sensing means for determining the position to which said particular counting means has been advanced by said advancing means in response to one group of said pulses, means for actuating said sensing means to cause the latter to determine said position at the same time a group of electrical pulses is being received by said input means representing the next number to be accumulated by said particular counting means, an electrical output means for simultaneously delivering coded electrical pulses representing the positions of the counting means of all of said counters as determined by their respective sensing means, and resetting means for feeding pulses into the input means of each counter independently when desired in representation of the nines complement of the number which has been accumulated by each said counter means to reset each counter to a setting representing zero.

17. A code counter group comprising a plurality of single digit code counters electrically and mechanically interconnected for the simultaneous accumulation of the separate digit components of numbers progressively presented to said counter group, each of said counters comprising a counting means for progressively accumulating a particular digit component of said numbers, an electrical input means for receiving coded electrical pulses representing said digit component to be accumulated by said particular counting means, mechanical advancing means for advancing said particular counting means in response to said pulses received by its said electrical input means, sensing means for determining the position to which said particular counting means has been advanced by said advancing means in response to one group of said pulses, means for actuating said sensing means to cause the latter to determine said position at the same time a group of electrical pulses is being received by said input means representing the next number to be accumulated by said particular counting means, an electrical output means for simultaneously delivering coded electrical pulses representing the positions of the counting means of all of said counters as determined by their respective sensing means, resetting means for feeding pulses into the input means of each counter independently when desired in representation of the nines complement of the number which has been accumulated by each said counter means to reset each counter to a setting representing zero, and means for automatically checking the counting means of each counter for a setting representing zero after said resetting means has been operated.

18. A code counter group comprising a plurality of single digit code counters electrically and mechanically interconnected for the simultaneous accumulation of the separate digit components of numbers progressively presented to said counter group, each of said counters comprising a counting means for progressively accumulating a particular digit component of said numbers, an electrical input means for receiving coded electrical pulses representing said digit component to be accumulated by said particular counting means, mechanical advancing means for advancing said particular counting means in response to said pulses received by its said electrical input means, sensing means for determining the position to which said particular counting means has been advanced by said advancing means in response to one group of said pulses, means for actuating said sensing means to cause the latter to determine said position at the same time a group of electrical pulses is being received by said input means representing the next number to be accumulated by said particular counting means, an electrical output means for simultaneously delivering coded electrical pulses representing the positions of the counting means of all of said counters as determined by their respective sensing means, carry storage means in each counter for storing each carry occurring during the progressive accumulation by each said counting means of numbers resulting from pulses received by its input means, and means for transferring each said carry except the carry in the highest order digit counter to the counting means of the next higher digit counter after said counting means have been advanced in response to particular numbers involved, and means for transferring a carry from the counting means of the highest order counter to the counting means of the lowest order counter.

19. A code counter group comprising a plurality of single digit code counters electrically and mechanically interconnected for the simultaneous accumulation of the separate digit components of numbers progressively presented to said counter group, each of said counters comprising a counting means for progressively accumulating a particular digit component of said numbers, an electrical input means for receiving coded electrical pulses representing said digit component to be accumulated by said particular counting means, mechanical advancing means for advancing said particular counting means in response to said pulses received by its said electrical input means, sensing means for determining the position to which said particular counting means has been advanced by said advancing means in response to one group of said pulses, means for actuating said sensing means to cause the latter to determine said position at the same time a group of electrical pulses is being received by said input means representing the next number to be accumulated by said particular counting means, an electrical output means for simultaneously delivering coded electrical pulses representing the positions of the counting means of all of said counters as determined by their respective sensing means, and means in any particular counter of said group for transmitting a carry pulse received from another counter of said group through said particular counter to a different order counter, at a position of the counting means of said particular counter representing a number nine.

20. A code counter group comprising a plurality of single digit code counters electrically and mechanically interconnected for the simultaneous accumulation of the separate digit components of numbers progressively presented to said counter group, each of said counters comprising a counting means for progressively accumulating a particular digit component of said numbers, an electrical input means for receiving coded electrical pulses representing said digit component to be accumulated by said particular counting means, mechanical advancing means for advancing said particular counting means in response to said pulses received by its said electrical input means, sensing means for determining the position to which said particular counting means has been advanced by said advancing means in response to one group of said pulses, means for actuating said sensing means to cause the latter to determine said position at the same time a group of electrical pulses is being received by said input means representing the next number to be accumulated by said particular counting means, an electrical output means for simultaneously delivering coded electrical pulses representing the positions of the counting means of all of said counters as determined by their respective sensing means, and a selectively energizable electrical output means for delivering coded electrical pulses representing the positions of all of said counting means after any particular set of numbers has caused the cumulative advance of the said counting means of all of said counters.

21. A mechanically driven, electrically controlled, direct entry binary code counter group arrangement comprising a plurality of single digit code counters for performing arithmetical operations on numerical quantities fed to the inputs of said counters in the form of binary code electrical pulses, said pulses being delivered to said inputs in a timed relationship to one another, each of said counters comprising a decimal counting means, means for converting said binary pulses into pulses representing another numerical code, mechanical advancing means for advancing said decimal counting means in response to said latter code, means for sensing the decimal number represented by the position of said counting means after the latter has been advanced to represent each of said numerical quantities while the pulses representing the next succeeding numerical quantity are being received at said inputs, output means and means for transmitting said decimal number as represented by each of said counting means to said output means in the form of binary code electrical pulses for further utilization.

22. A mechanically driven, electrically controlled, direct entry binary code counter group arrangement comprising a plurality of single digit code counters for performing arithmetical operations on numerical quantities fed to the inputs of said counters in the form of binary code electrical pulses, said pulses being delievered to said inputs in a timed relationship to one another, each of said counters comprising a decimal counting means, means for converting said binary pulses into pulses representing another numerical code, mechanical advancing means for advancing said decimal counting means in response to said latter code, sensing means for sensing the decimal number represented by the position of said counting means after the latter has been advanced to represent each of said numerical quantities, means for actuating said sensing means to cause the latter to determine said position while the pulses representing the next succeeding numerical quantity are being received at said inputs, output means, means for transmitting said decimal number as represented by each of said counting means to said output means in the form of binary code electrical pulses for further utilization and means for advancing said counting means by amounts representing the nines complement of a number presented in code to said input which is to be substracted from the number already represented by the positions of advance of said counting means.

23. A mechanically driven, electrically controlled, direct entry binary code counter group arrangement comprising a plurality of single digit code counters for performing arithmetical operations on numerical quantities fed to the inputs of said counters in the form of binary code electrical pulses, said pulses being delivered to said inputs in a timed relationship to one another, each of said counters comprising a decimal counting means, means for converting said binary pulses into pulses representing another numerical code, mechanical advancing means for advancing said decimal counting means in response to said latter code, sensing means for sensing the decimal number represented by the position of said counting means after the latter has been advanced to represent each of said numerical quantities, means for actuating said sensing means to cause the latter to determine said position while the pulses representing the next succeeding numerical quantity are being received at said inputs, output means, means for transmitting said decimal number as represented by each of said counting means to said output means in the form of binary code electrical pulses for further utilization and means for determining the presence of negative numbers in said counter group.

24. A mechanically driven, electrically controlled, direct entry binary code counter group arrangement comprising a plurality of single digit code counters for performing arithmetical operations on numerical quantities fed to the inputs of said counters in the form of binary code electrical pulses, said pulses being delivered to said inputs in a timed relationship to one another, each of said counters comprising a decimal counting means, means for converting said binary pulses into pulses representing another numerical code, mechanical advancing means for advancing said decimal counting means in response to said latter code, sensing means for sensing the decimal number represented by the position of said counting means after the latter has been advanced to represent each of said numerical quantities, means for actuating said sensing means to cause the latter to determine said position while the pulses representing the next succeeding numerical quantity are being received at said inputs, output means, means for transmitting said decimal number as represented by each of said counting means to said output means in the form of binary code electrical pulses for further utilization, resetting means for feeding the nines complement of the number standing in the counting means of said counter group from said output in the form of binary coded electrical pulses back into said input of said counter group to reset said counter group to a zero setting and means for automatically checking said counter group for a zero setting after said resetting means has been operated.

25. A mechanically driven, electrically controlled, direct entry binary code counter group arrangement comprising a plurality of single digit code counters for performing arithmetical operations on numerical quantities fed to the inputs of said counters in the form of binary code electrical pulses, said pulses being delivered to said inputs in a timed relationship to one another, each of said counters comprising a decimal counting means, means for converting said binary pulses into pulses representing another numerical code, mechanical advancing means for advancing said decimal counting means in response to said latter code, sensing means for sensing the decimal number represented by the position of said counting means after the latter has been advanced to represent each of said numerical quantities, means for actuating said sensing means to cause the latter to determine said position while the pulses representing the next succeeding numerical quantity are being received at said inputs, output means, means for transmitting said decimal number as represented by each of said counting means to said output means in the form of binary code electrical pulses for further utilization, means in each counter for storing a carry arising during the progressive advance of the counting means for the accumulation of a number to said counting means, means for transferring said carry to the counting means of the next higher digit counter after said number has been entered into said counting means, means for transferring a carry from the counting means of the highest order counter to the counting means of the lowest order counter and means for transmitting a carry pulse received from the next lower order counter through to the next higher order counter, at a position of the present counting means representing a number nine.

26. A code counter comprising a rotatable counting drum for progressively accumulating single digit numbers, electrical input means for receiving modified binary coded electrical pulses representing numbers to be accumulated by said drum, alternatively operable mechanical advancing means for rotating said drum stepwise in response to said pulses as received by said input means, sensing means for determining the position to which said drum has been rotatively advanced by said alternatively operable mechanical advancing means in response to one group of said pulses, means for actuating said sensing means to cause the latter to determine said position at the same time a succeeding group of electrical pulses is being received by the same said input means in representation of the next number to be accumulated by said counting drum, means for so operating said sensing means, and electrical output means operable in conjunction with said sensing means for delivering coded electrical pulses representing the position of said counting drum each time said sensing means determines its position.

27. A code counter comprising a rotatable counting drum for progressively accumulating single digit numbers, electrical input means for receiving coded electrical pulses representing numbers to be accumulated by said drum, a group of synchronously rotatable programming cams, alternatively movable mechanical advancing means operable by cams of said group for rotating said drum stepwise in response to said pulses as received by said input means, sensing means operable by other cams of the group for determining the position to which said drum has been rotatively advanced by said alternatively operable mechanical advancing means in response to one group of said pulses, said position being determined by said sensing means as operated by said other cams of the group of cams at the same time a succeeding group of electrical pulses is being received by said input means in representation of the next number to be accumulated by said drum, and electrical output means controlled by said other cams and operable in conjunction with said sensing means for delivering coded electrical pulses representing the position of said counting drum each time said sensing means determines its position.

28. A code counter comprising a counting means for progressively accumulating single digit numbers, electrical input means for receiving coded electrical pulses representing said numbers to be accumulated by said counting means, advancing means for advancing said counting means in response to said pulses received by said input means, sensing means for determining the position to which said counting means has been advanced by said advancing means in response to one group of said pulses, said position being determined by said sensing means at the same time a succeeding group of electrical pulses is being received by said input means representing the next number to be accumulated by said counting means, and an electrical output means for delivering coded electrical pulses representing the position of said counting means as determined by said sensing means, the above noted counting means including a drum rotatable by said advancing means in one direction only about its longitudinal axis, said drum having recesses distributed on its peripheral surface representing binary code components of decimal numbers from zero through nine and also the nines complements of said numbers, appropriate of said recesses in said surface representing a decimal member being presentable to said sensing means at the locations of the latter when said appropriate recesses have been advanced to said locations by rotational advance of said drum by said advancing means.

29. The counter of claim 28 including a storage means for temporarily noting the sensing of a particular recess in said drum, said storage means comprising a switch closing means for effecting the closing of an electrical switch to provide an electrical pulse conduction path in said output means, said closing means being movable from a switch open position to a switch closed position, latching means for releasably maintaining said closing means in a switch open position, tripping means attached to one of said sensing means for moving said latch means to a released position relative to said closing means when latter said sensing means moves into sensing position relative to said counting means, cam means for actuating latter said sensing means, resetting means for moving said closing means into a switch open position and for moving said latching means into a locked position relative to said closing means.

30. The counter of claim 28 wherein said sensing means comprises a row of cam actuated finger members disposed along the length of said drum and adjacent thereto, said finger members being movable against the adjacent peripheral surface of said drum in a related time sequence to close electrical contacts upon their location of recesses in said surface thereby completing pulse conduction circuits for said electrical input means and for said electrical output means.

31. The counter of claim 28 wherein said sensing means comprises a row of cam actuated finger members disposed along the length of said drum and adjacent thereto, said finger members being movable against the adjacent peripheral surface of said drum in a related time sequence to close electrical contacts upon their location of recesses in said surface thereby completing pulse conduction circuits for said electrical input means, and also completing pulse conduction circuits for said electrical output means, one group of said latter circuits for transmitting pulses corresponding to the number represented by the position to which said drum has been advanced and another group of said latter circuits for transmitting pulses representing the nines complement of said number, and means for selecting one of the latter groups of circuits.

References Cited in the file of this patent

UNITED STATES PATENTS

| | | |
|---|---|---|
| 1,989,848 | Daly | Feb. 5, 1935 |
| 2,369,430 | Brand et al. | Feb. 13, 1945 |